(12) United States Patent
Novaes et al.

(10) Patent No.: US 7,185,076 B1
(45) Date of Patent: Feb. 27, 2007

(54) METHOD, SYSTEM AND PROGRAM PRODUCTS FOR MANAGING A CLUSTERED COMPUTING ENVIRONMENT

(75) Inventors: Marcos N. Novaes, Hopewell Junction, NY (US); Gregory D. Laib, Kingston, NY (US); Ronald T. Goering, Austin, TX (US); Jeffrey S. Lucash, Hurley, NY (US); Peter R. Badovinatz, Beaverton, OR (US); Michael A. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 09/583,677

(22) Filed: May 31, 2000

(51) Int. Cl.
*G06F 15/173* (2006.01)

(52) U.S. Cl. ............... 709/223; 709/217; 709/220; 709/231; 709/248

(58) Field of Classification Search ........... 709/100, 709/220, 223, 106, 248
See application file for complete search history.

(56) References Cited

U.S. PATENT DOCUMENTS

| | | | |
|---|---|---|---|
| 4,958,273 A | 9/1990 | Anderson et al. | 364/200 |
| 5,291,480 A | 3/1994 | Nimon | 370/58.1 |
| 5,649,141 A | 7/1997 | Yamazaki | 395/416 |
| 5,666,486 A * | 9/1997 | Alfieri et al. | 709/217 |
| 5,694,550 A | 12/1997 | Takeda et al. | 395/200.11 |
| 5,748,958 A | 5/1998 | Badovinatz et al. | 395/670 |
| 5,752,264 A | 5/1998 | Blake et al. | 711/144 |
| 5,842,034 A | 11/1998 | Bolstad et al. | 395/800.11 |
| 5,890,007 A | 3/1999 | Zinguuzi | 395/800.06 |
| 5,950,228 A | 9/1999 | Scales et al. | 711/148 |
| 5,964,838 A * | 10/1999 | Cheung et al. | 709/224 |
| 6,088,727 A | 7/2000 | Hosokawa et al. | 709/223 |
| 6,163,855 A * | 12/2000 | Shrivastava et al. | 714/4 |
| 6,338,112 B1 * | 1/2002 | Wipfel et al. | 710/269 |
| 6,393,485 B1 * | 5/2002 | Chao et al. | 709/231 |

FOREIGN PATENT DOCUMENTS

| | | |
|---|---|---|
| EP | 1 117 210 A2 | 7/2001 |
| JP | 10-187638 | 7/1998 |
| WO | WO 96/37837 | * 11/1996 |
| WO | WO 99/21091 | 4/1999 |
| WO | WO 00/58825 | 10/2000 |
| WO | WO 01/84338 A2 | 11/2001 |

* cited by examiner

*Primary Examiner*—Saleh Najjar
*Assistant Examiner*—Michael Y. Won
(74) *Attorney, Agent, or Firm*—Lawrence D. Cutter, Esq.; Blanche E. Schiller, Esq.; Heslin Rothenberg Farley & Mesiti P.C.

(57) ABSTRACT

Various components are provided to manage a clustered environment. These components include a System Registry that provides a global data storage; a Configuration manager that stores data locally on nodes of the clustered environment and globally within the System Registry; a Liveness component to provide status of communications paths of the cluster; a Group Services component that provides services to one or more other components of the clustered environment; and a Resource Management component that communicates with one or more resource controllers of the clustered environment. Each of the components of the clustered environment has one or more data and/or functional dependencies on one or more other components of the environment. However, relationships between the components are created such that the data and functional dependencies form an acyclic graph (i.e., a cycle of dependency relationships is avoided).

65 Claims, 22 Drawing Sheets

DATA DEPENDENCIES

METHOD, SYSTEM AND PROGRAM PRODUCTS FOR MANAGING A CLUSTERED COMPUTING ENVIRONMENT

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Method, System And Program Products For Providing Clusters Of A Computing Environment," Novaes et al., Ser. No. 09/583,686, filed May 31, 2000;

"Method, System And Program Products For Defining Nodes To A Cluster," Novaes et al., Ser. No. 09/583,582, filed May 31, 2000;

"Method, System And Program Products For Ordering Lists Of Service Addresses To Provide Load Balancing Of A Clustered Environment," Novaes et al., Ser. No. 09/584,638, filed May 31, 2000;

"Method, System And Program Products For Controlling System Traffic Of A Clustered Computing Environment," Novaes et al., Ser. No. 09/583,849, filed May 31, 2000;

"Method, System And Program Products For Automatically Configuring Clusters Of A Computing Environment," Novaes et al., Ser. No. 09/584,528, filed May 31, 2000;

"Method, System And Program Products For Managing Identifiers Of Components Of A Clustered Environment," Novaes et al., Ser. No. 09/584,935, filed May 31, 2000; and "Method, System And Program Products For Managing Cluster Configurations," Novaes et al., Ser. No. 09/583,693, filed May 31, 2000.

TECHNICAL FIELD

This invention relates, in general, to a distributed computing environment, and in particular, to managing one or more clusters of nodes of a distributed computing environment.

BACKGROUND ART

Distributed systems are highly-available, scalable systems that are utilized in various situations, including those situations that require a high-throughput of work or continuous or nearly continuous availability of the system.

A distributed system that has the capability of sharing resources is referred to as a cluster. A cluster includes operating system instances, which share resources and collaborate with each other to perform system tasks. While various cluster systems exist today (such as the RS/6000 SP system offered by International Business Machines Corporation), further enhancements to the existing cluster systems are still desired. For example, enhancements are desired to facilitate the administration of cluster systems.

SUMMARY OF THE INVENTION

The shortcomings of the prior art are overcome and additional advantages are provided through the provision of a system of managing clusters of a computing environment. The system includes, for instance, a registry component to provide global data storage for data of a cluster of the computing environment, the cluster including one or more nodes of the computing environment; a configuration component to maintain data locally on at least one node of the one or more nodes, and to store global data in the registry component; a liveness component to provide status of one or more communications paths of the cluster, the liveness component being dependent upon the registry component and the configuration component; a group services component to provide one or more services to one or more other components of the cluster, the group services component being dependent on the registry component, the configuration component and the liveness component; and a resource management component to provide communications to one or more resource controllers of the cluster, the resource management component being dependent on the registry component, the configuration component and the group services component.

Method and computer program products corresponding to the above-summarized systems are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one or more aspects of the present invention, a distributed computing environment, which utilizes one or more copies of an operating system, is managed. Each copy of the operating system is configured such that it has access to a set of resources (e.g., processors, network interfaces, files, file systems, storage devices, peripherals, etc.). This access can be exclusive or shared with the other copies of the operating system. If the resources are to be shared, then the individual copies of the operating system collaborate and share the system resources that they control. In order to share the resources, the operating system copies negotiate the access, such that the integrity of the resources are preserved. For example, two copies of an operating system which need to write multiple blocks of data to a certain segment of a storage device negotiate the access to the segment, otherwise the order of the write operations may compromise the integrity of the data being written.

Figure 1:
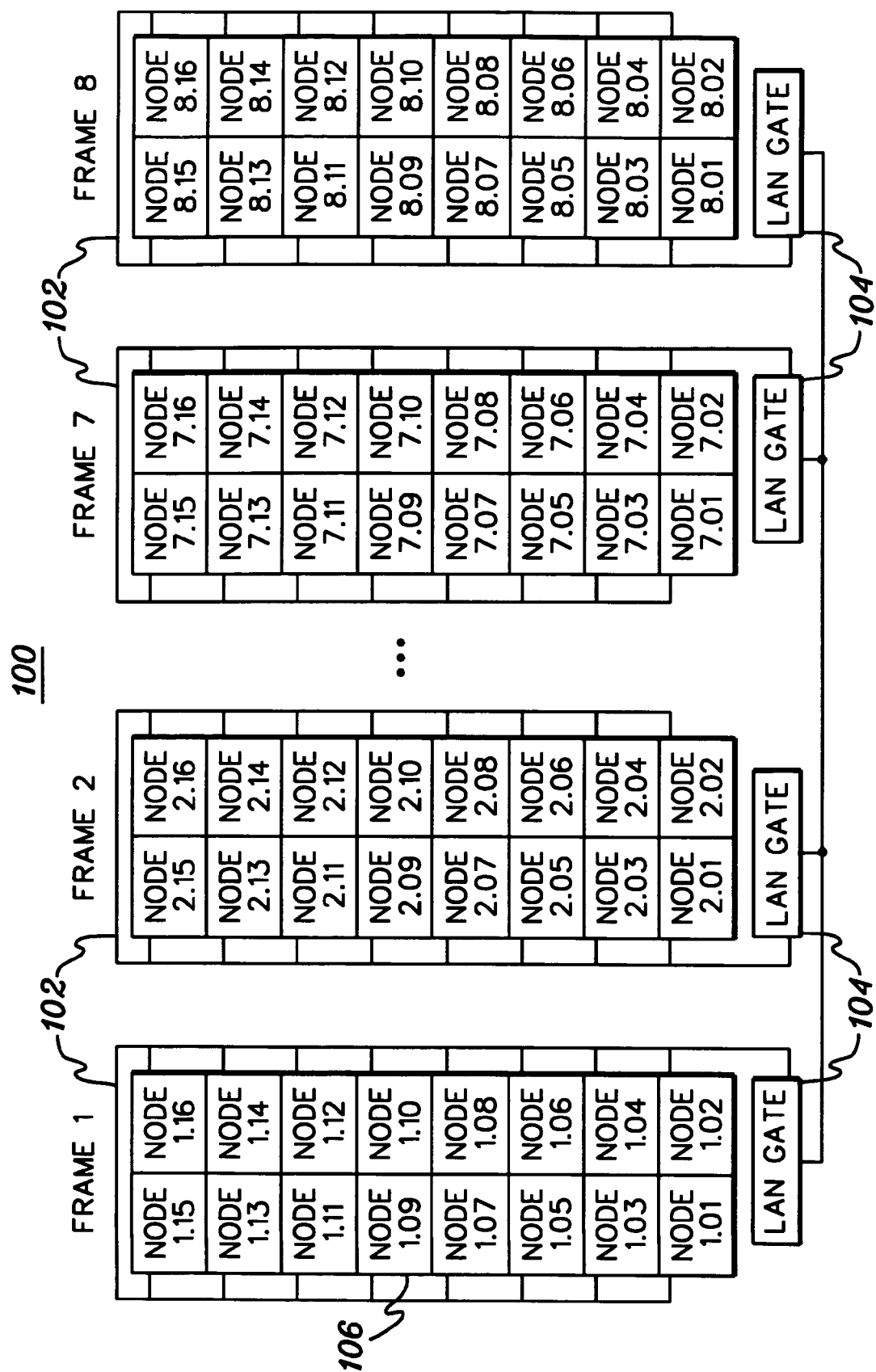
FIG. 1 depicts one example of a computing environment incorporating and using aspects of the present invention.

One example of a distributed computing environment incorporating and using aspects of the present invention is depicted in FIG. 1 and described herein. A distributed computing environment 100 includes, for instance, a plurality of frames 102 coupled to one another via a plurality of LAN gates 104. Frames 102 and LAN gates 104 are described in detail below.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame via, for example, an internal LAN connection. Additionally, each frame is coupled to the other frames via LAN gates 104.

As examples, each LAN gate 104 includes either a RISC/6000 computer, any computer network connection to the LAN, or a network router. However, these are only examples. It will be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. Further, a heterogeneous environment can include and utilize aspects of the invention, in which one or more of the nodes and/or operating systems of the environment are distinct from other nodes or operating systems of the environment. The nodes of such a heterogeneous environment interoperate, in that they collaborate and share resources with each other, as described herein. Further, aspects of the present invention can be used within a single computer system. All of these variations are considered a part of the claimed invention.

Figure 2:
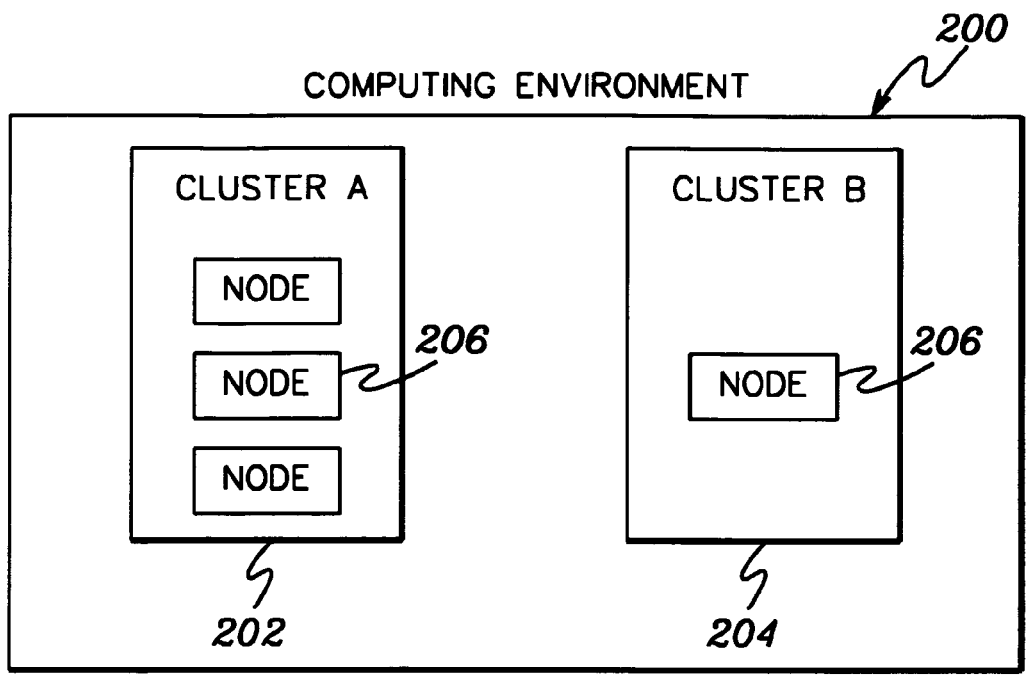
FIG. 2 depicts one embodiment of a computing environment having a plurality of clusters, in accordance with an aspect of the present invention.

A distributed computing environment, which has the capability of sharing resources, is termed a cluster. In particular, a computing environment can include one or more clusters. For example, as shown in FIG. 2, a computing environment 200 includes two clusters: Cluster A 202 and Cluster B 204. Each cluster includes one or more nodes 206, which share resources and collaborate with each other in performing system tasks. Each node includes an individual copy of the operating system.

Figure 3:
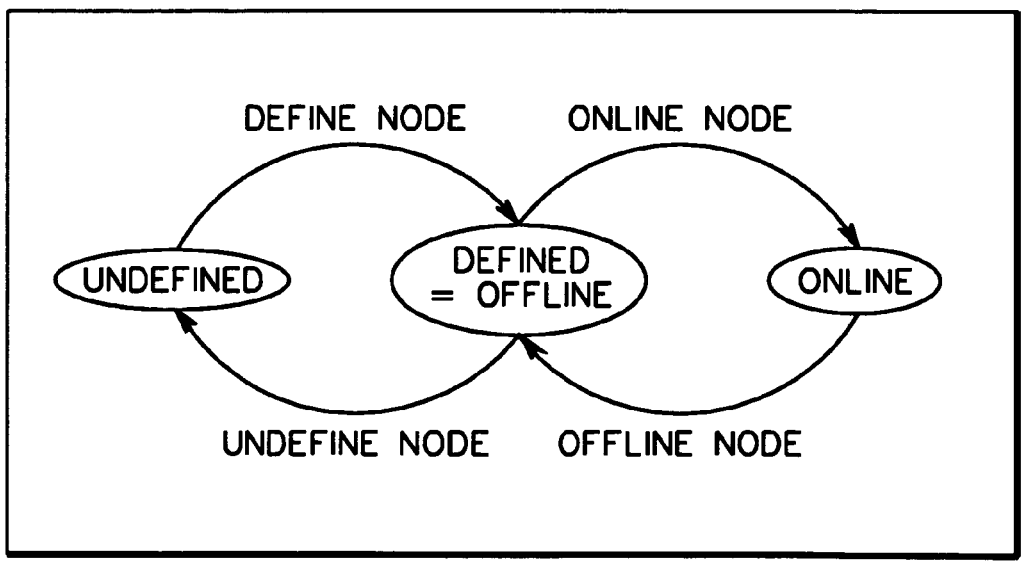
FIG. 3 depicts one embodiment of the states of a node of a cluster, in accordance with an aspect of the present invention.

There are two aspects in considering the membership of a node to a particular cluster. One aspect is related to the static configuration of the cluster. This aspect is referred to as the node definition (see FIG. 3). If a node is defined to the cluster, then the other nodes in the cluster are cognizant of this node. A node is defined to the cluster after a successful node definition operation (further described below). Conversely, a node is undefined to the cluster, after a node deletion operation.

The static aspect of the node is different than its dynamic (or run-time) attribute, called cluster membership. The cluster membership refers to the fact that a node is considered to be a member of the cluster when it is defined and operational (i.e., online). The term operational here alludes to the fact that the node is perceived by the other members of the cluster as a functional node; that is, a node which is capable of performing basic functions which are termed liveness tasks. As one example, a node performs a set of liveness tasks continuously, and reports to the other nodes on its ability to perform such tasks by sending to the other members of the cluster heartbeat messages at regular intervals.

The cluster membership can be viewed as a list of nodes, which are functioning as an integral part of the cluster at any point in time. This list is available to all nodes, and in an aspect of the present invention, the cluster architecture ensures that all nodes have access to the same membership list at any point in time, even in shared-nothing distributed systems. (A shared-nothing distributed system is a system in which the nodes do not have any shared physical resources, such as disks or memory.) In order to maintain an identical view of the particular data in such systems, sophisticated synchronization protocols are used, since the data has to be distributed to all nodes in atomic transactions.

Specific protocols are used to add or delete a node from the membership list. For example, the process by which a node is added to the membership list is called a node join process. Conversely, a node is deleted from the membership list by the node leave process. If a node is not listed in the cluster membership, the node has left the cluster.

Each cluster is managed by a cluster architecture, which includes a plurality of components. Each component executes one or more corresponding processes on one or more nodes of the cluster, as described in more detail herein. If the component executes a plurality of processes on a plurality of nodes, then the architecture is distributed across those nodes. A distributed architecture is only one example, however. One or more aspects of the present invention can be employed on a single or non-distributed system.

In one example, the components of the cluster architecture include a Distributed Configuration Manager (DCM) 400 (FIG. 4) utilized to configure the cluster system and to coordinate the synchronization of the cluster configuration databases (described below), which occurs when a node joins or leaves a cluster; a System Registry server subsystem 402, which includes one or more processes which serve the data stored in a cluster configuration database; a Liveness subsystem 404 maintains the cluster membership list, which provides information about the availability of communication paths among the members of the cluster; a Group Services subsystem 406, which provides a facility in which other cluster processes can form logical groups and maintain a consistent group state and process membership; and a Resource Manager subsystem 408, which is a facility that administers the access and control of the cluster resources and also provides a facility with which cluster clients can monitor the state and configuration of the cluster resources.

Figure 4:
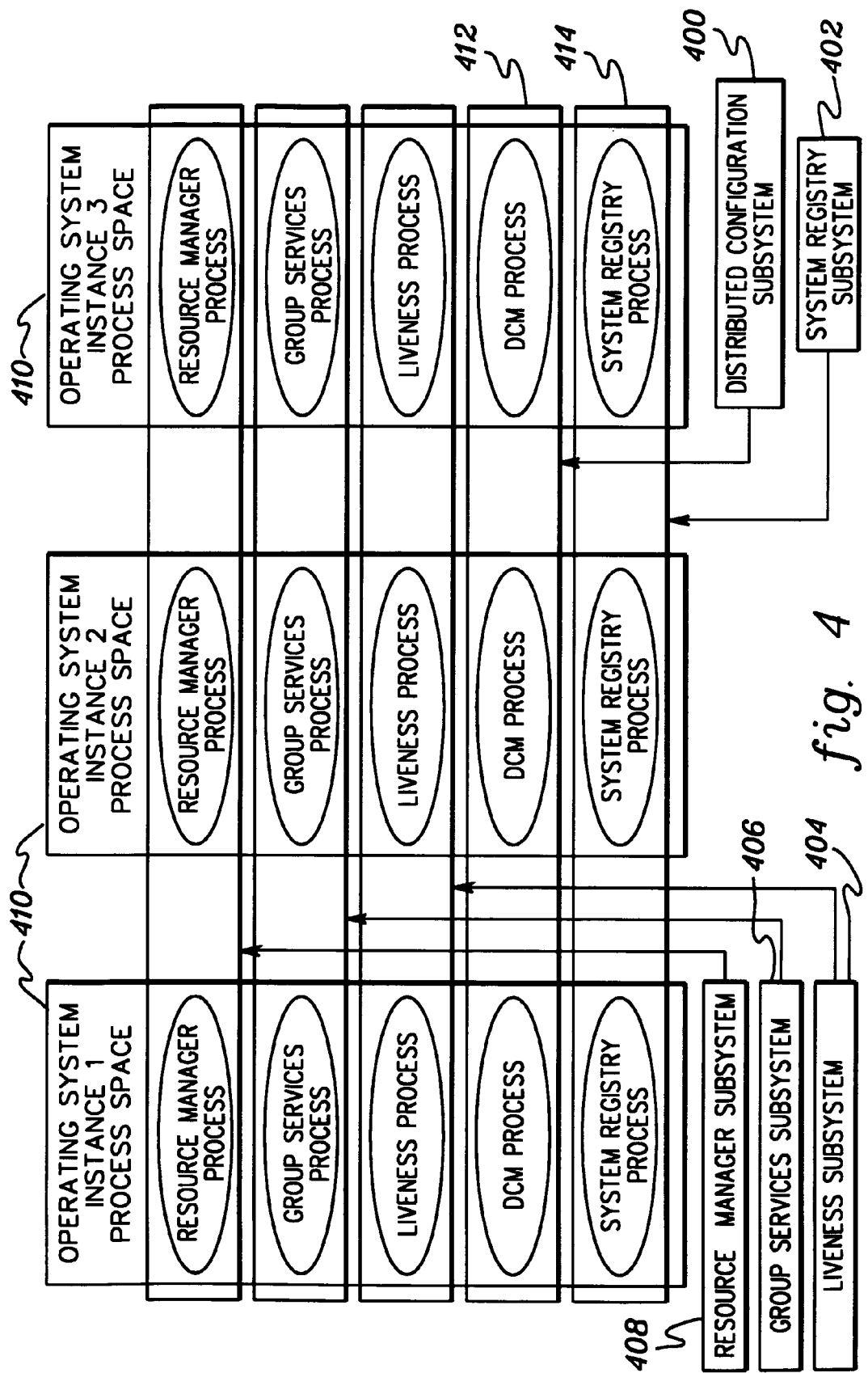
FIG. 4 depicts one embodiment of the components of a cluster architecture used in accordance with an aspect of the present invention.

In one embodiment, as shown in FIG. 4, each of the components is distributed across a plurality of nodes 410. That is, each component is executing a process on the plurality of nodes. For example, DCM 400 is executing a DCM process 412 on the three depicted nodes. The same is true for the other components, each of which is described in further detail below.

Distributed Configuration Manager (DCM) subsystem 400 provides a copy of a computer program, referred to as a Distributed Configuration Manager Daemon (DCMD) 412, on each node that is to be configured as part of the cluster. The DCMD is the bootstrapping agent of the cluster. As such, the DCMD process is responsible for starting the other cluster components with the appropriate cluster configuration. The DCMD is also the process which stops the other cluster components when appropriate, such as in the case that a node is moved from one cluster to another. The DCMD is itself bootstrapped by the base operating system of the node, and is the only cluster component, in this example, to be bootstrapped directly by the operating system.

The DCMD maintains a collection of files in local storage of each node, which are related to one or more cluster configurations. In addition to the local configuration data, the DCMD also stores global configuration data in the Server Repository. The cluster configuration data is described further below.

Figure 5:
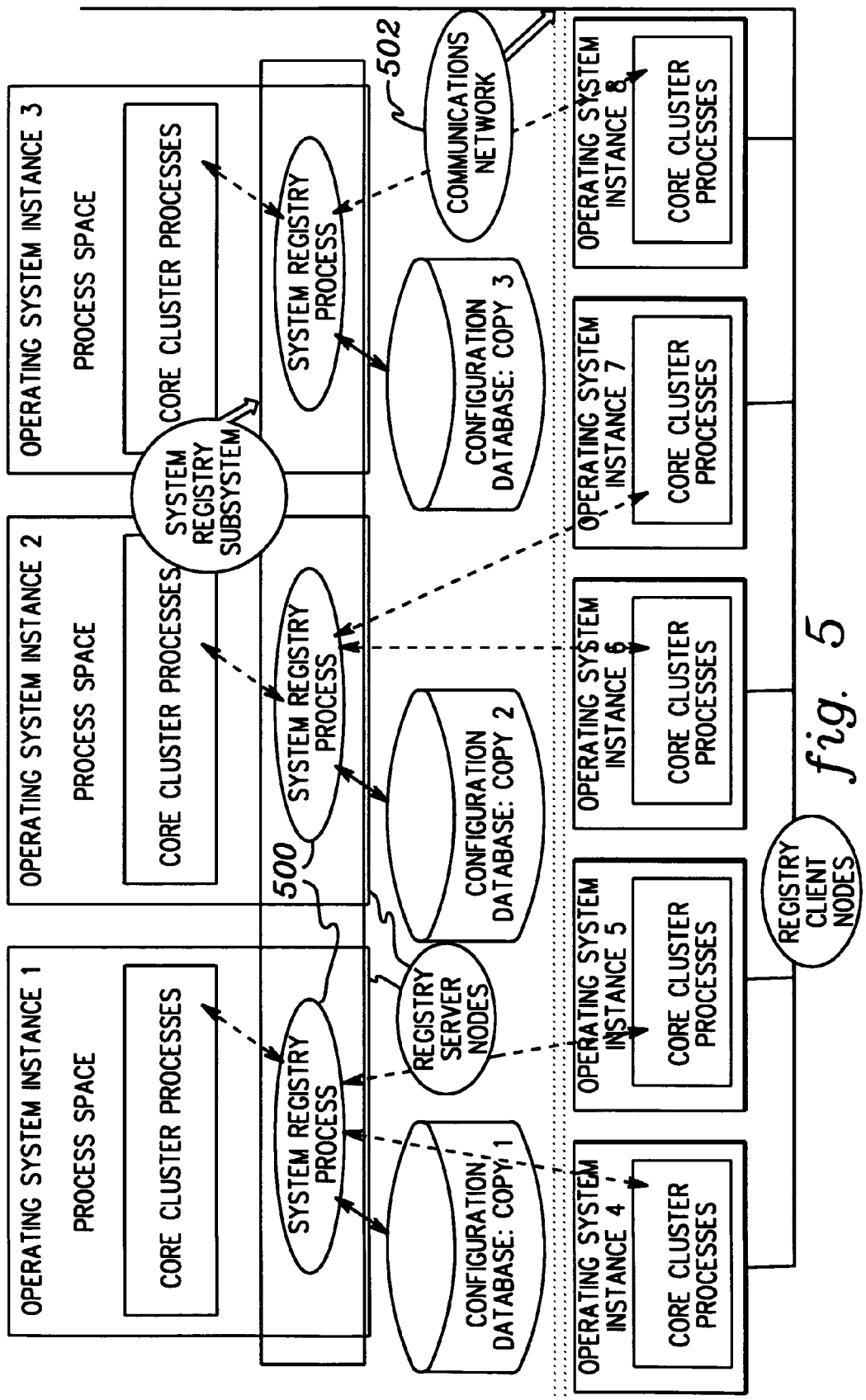
FIG. 5 depicts one embodiment of a clustered environment in which the System Registry component of FIG. 4 is located on only a portion of the nodes of the environment, in accordance with an aspect of the present invention.

System Registry component 402 provides the function of global data storage. It is highly available, and in one example, replicated among a plurality of nodes as System Registry processes 414 (FIG. 4). In one embodiment, however, the System Registry is replicated on fewer than all of the nodes of a cluster, as depicted in FIG. 5. As shown in FIG. 5, Nodes (i.e., operating system instances) 1, 2, and 3 include a System Registry process 500, while Nodes 4–8 do not. All of the nodes in this particular example, however, do include the other core cluster processes (e.g., DCM process, Liveness process, Group Services process and Resource Manager process). Nodes 4–8 are considered registry client nodes, while Nodes 1–3 are considered registry server nodes, since the registry function is executed on those nodes.

Liveness component 404 (FIG. 4) provides the status of the communications adapters and the availability of communications paths among nodes in the cluster. Each node is connected to a communications network 502 (as shown in FIG. 5) via one or more communications adapters. It is possible for any such adapters to fail, affecting one or more communications paths in the network, which interconnects the cluster nodes. The Liveness component runs a process in one or more nodes of the cluster, which sends periodic verification messages, called heartbeats, from each communications adapter in each node. The collection of liveness processes in the nodes exchanges messages about the partial knowledge of the availability of each adapter, and through these messages the liveness system can logically infer the state of each communications adapter in the cluster system, and also the availability of a communications path between any two adapters.

Group Services component 406 provides generic membership services to the other components. These services include facilities for carrying out two phase commit protocols, also called atomic broadcasts. It also includes facilities with which the members of a group can control membership to the group and maintain a group state. (One example of Group Services is described in detail in U.S. Pat. No. 5,748,958 entitled "System For Utilizing Batch Requests To Present Membership Changes To Process Groups", issued on May 5, 1998, which is hereby incorporated herein by reference in its entirety.)

Resource Management component 408 provides a basic communications layer to other cluster services, which are not part of the core cluster services (e.g., DCM, System Registry, Liveness, Group Services and Resource Manager). These services fall in the category of additional resource controllers, as described below. In one example, this communications protocol is object oriented. Thus, any resource controller that is to be controlled by the Resource Management component provides to the Resource Management component a resource description file, which defines the resource objects that it controls. This definition is made in terms of a set of attributes or data fields, and of functions which are supported by each resource controller.

Each of the components of the cluster architecture has one or more data and/or functional dependencies on one or more other components of the architecture, which define relationships between the various components (i.e., intercomponent relationships). These relationships are designed, in accordance with one aspect of the present invention, such that the data and functional dependencies form an acyclic graph (i.e., a cycle of dependency relationships is avoided.)

Figure 6:
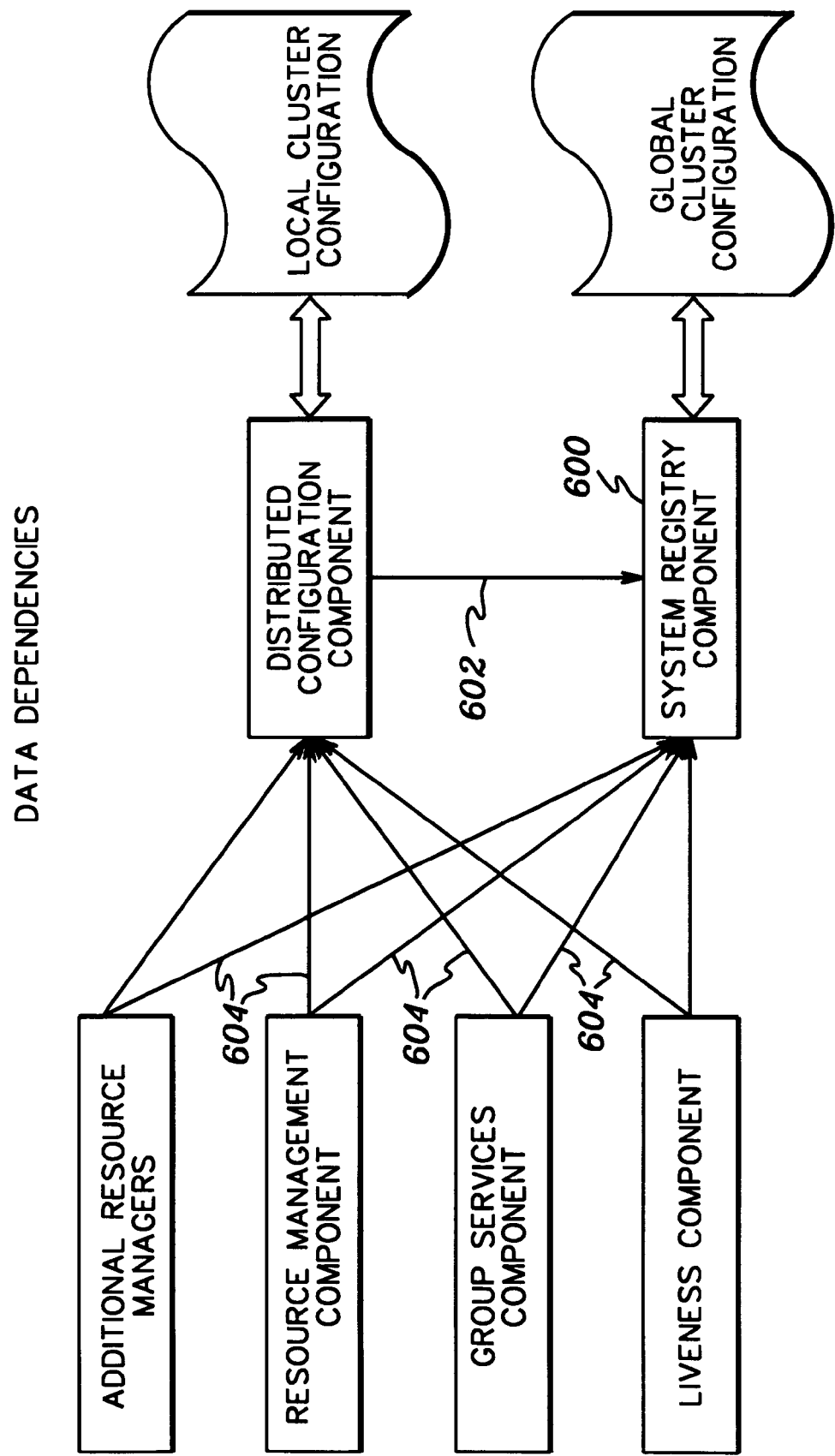
FIG. 6 depicts one example of the data dependencies of the various components of the clustered architecture, in accordance with an aspect of the present invention.

One example of the data dependencies for each component is pictorially illustrated in FIG. 6 and further described below:

(A) System Registry: The System Registry has no data dependencies 600 on any other component of the cluster, which is a unique trait of the System Registry. It is itself able to store all of its configuration data. The System Registry component is designed such that it can be used as a leaf in the dependency graph, and thus, avoid any cyclic relationship. The System Registry has the capability of storing its own configuration data, in a highly available manner. The System Registry is designed as a replicated data repository in which requests are propagated using transactional logic.

(B) Distributed Configuration Manager (DCM): The DCM component has the capability of storing a local version of the core cluster configuration data locally on every node, as well as the capability of storing global data in the System Registry. In one example, at least a portion of the local configuration data is to be consistent with the global data. However, in some cases, it is possible that the local configuration data stored by the DCM subsystem may get out of sequence with the data which is stored globally in the System Registry subsystem. This will happen, for example, if the node misses an update while it is disconnected from the cluster, for maintenance reasons, as one example.

For example, a node may malfunction and be sent for repair. In the meantime, the system administrator of the clustered system may decide to undefine the damaged node, therefore deleting its definition from the global registry with an undefine node operation. When the damaged node is fixed, and then reconnected to the cluster, it should no longer be allowed to share the cluster resources, since it has been undefined to the cluster. Nevertheless, the local cluster configuration in the recently fixed node is out of date, and still shows the node as defined to the cluster. In order to detect such cases, the DCMD daemon, which is the bootstrapping agent for all the other cluster components, checks the validity of the local cluster definition before starting the node join process. This creates a data dependency 602 of the DCMD daemon on the System Registry component.

(C) The remaining core cluster components (Liveness, Group Services and Resource Management) have a common data dependency 604 on the Distributed Configuration Manager component, because they utilize the local cluster configuration stored by DCM. For example, the local cluster configuration contains bootstrapping information, such as node name and number, and the list of nodes which run the Registry Server process, which is used by the cluster components in this architecture. With the exception of the System Registry component itself, the other components use that list of nodes in order to be able to connect to a Registry Server and retrieve the global cluster configuration, described below.

(D) All the components, with the exception of the System Registry itself, have a data dependency on the global cluster configuration.

Figure 7:
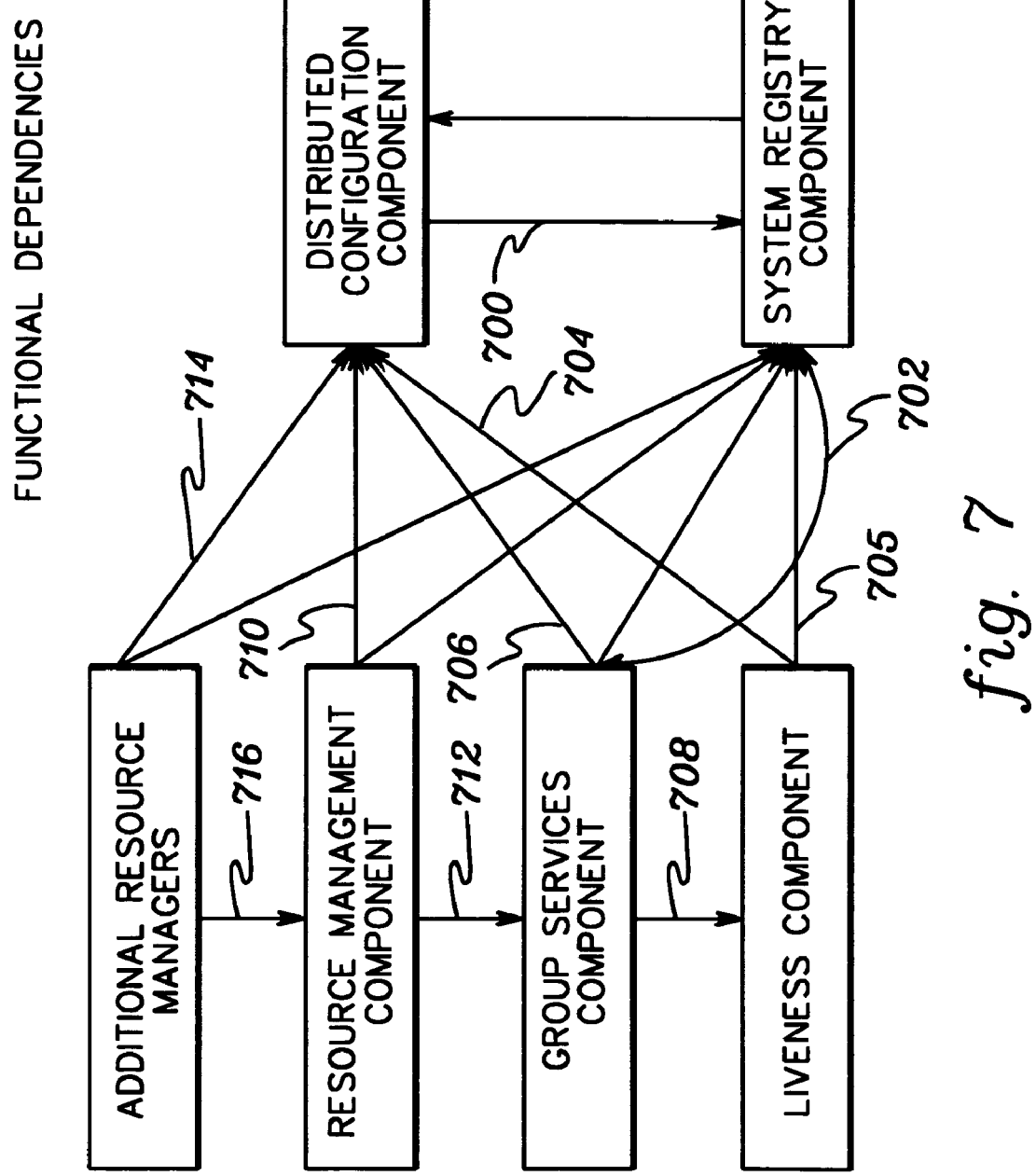
FIG. 7 depicts one example of the functional dependencies of the various components of the clustered architecture, in accordance with an aspect of the present invention.

One example of the functional dependencies of each component is pictorially illustrated in FIG. 7 and further described below:

(A) Distributed Configuration Manager (DCM): The DCM depends on the availability of the global storage function, which is provided by the System Registry component (see reference numeral 700).

(B) System Registry: The System Registry has a functional dependency 702 on the Group Services component. This dependency is generated by the fact that the System Registry utilizes the membership services of the Group Services component in order to propagate write operations. Because the global cluster configuration data is replicated in each node that functions as a Registry Server node, any modifications to it involve replicated write operations. During such write operations, there is a risk that one of the replicas may fail, making it desirable to implement logic for distributed recovery of a replicated operation. The membership services offered by the Group Services component include one example of such distributed recovery logic.

The functional dependency on the Group Services component only effects write operations, however. The System Registry component has no dependencies on the Group Service component for operations of type read. Therefore, the System Registry component is able to complete the first phase of its initialization (further described below) after being bootstrapped by the DCMD component. After this phase is complete, the System Registry has retrieved the most recently updated copy of the cluster configuration database, and is capable of allowing the other components to read the cluster configuration data. This in turn allows the Group Services component to complete its own initialization, which makes it possible for the System Registry component to proceed with a second phase of its initialization, as described below.

(C) Liveness Component: The Liveness component is bootstrapped by the DCMD (see reference numeral 704), and stores the configuration of the liveness subsystem in the registry (see reference numeral 705). It has no other functional dependencies on any other component.

(D) Group Services Component: The Group Services component is bootstrapped by the DCMD (706). It also has a functional dependency (708) on the Liveness component, because it needs to know the availability of the communication paths among the nodes in the cluster.

(E) Resource Manager Component: The Resource Manager component is bootstrapped by the DCMD (710). It also has a dependency (712) on the group membership function exported by the Group Services component. It uses the membership function in order to determine the version number of its configuration database.

The additional resource managers also have a functional dependency (714) on DCM, as well as a functional dependency (716) on the Resource Manager component.

Figure 8:
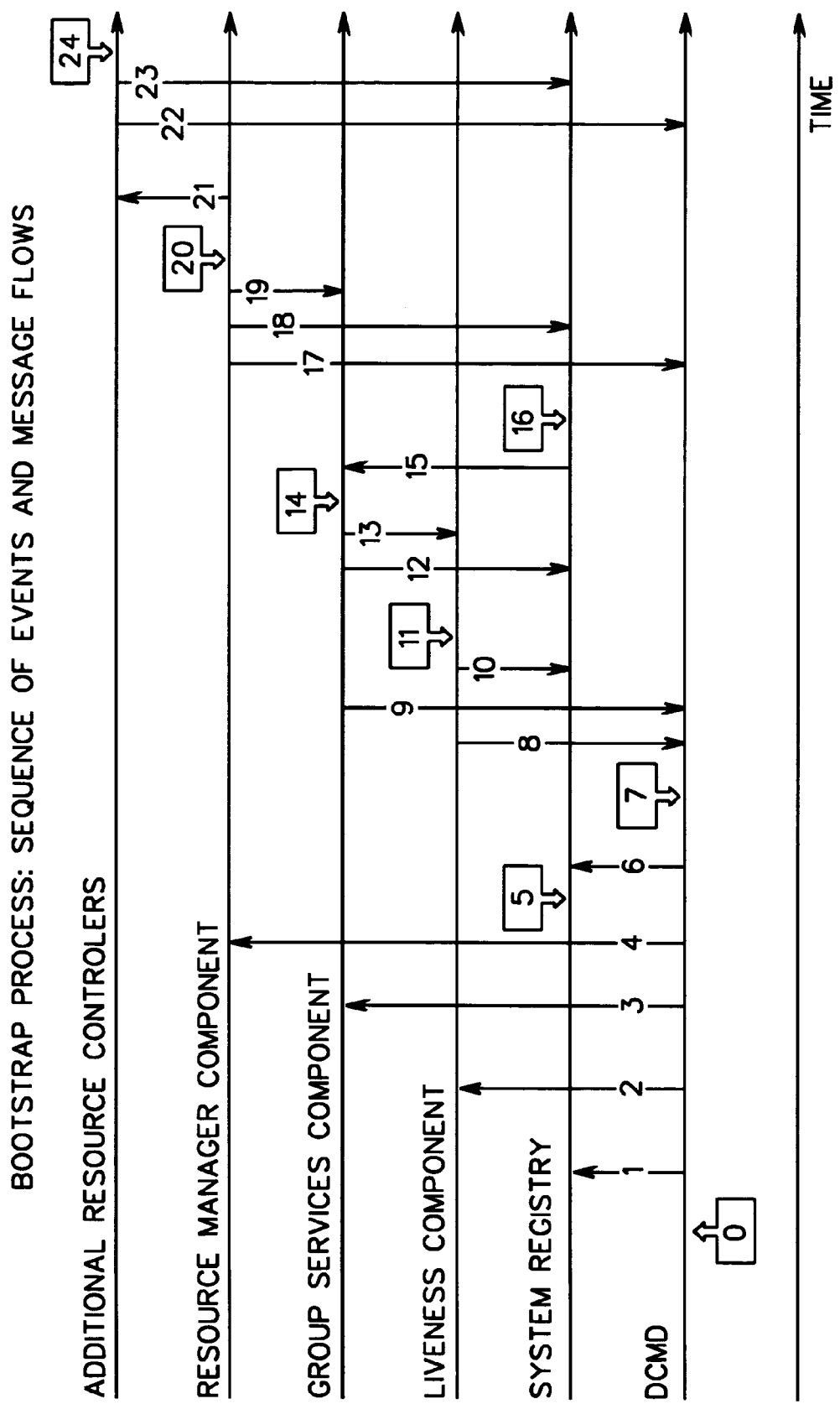
FIG. 8 depicts one embodiment of the sequence of events and message flow of a bootstrap process, in accordance with an aspect of the present invention.

The data and/or functional dependencies of the components are satisfied during a bootstrapping process of the clustering technique. In one example, a particular sequence of events and messages is utilized in order to satisfy the dependencies during the cluster bootstrap process. One example of this sequence is depicted in FIG. 8 and described herein.

At Step 0, the bootstrapping sequence is commenced. The cluster architecture is designed, for instance, as a layer of software, which is started by the operating system. After the basic operating system bootstrap process, the operating system bootstraps the cluster software by starting the Distributed Configuration Manager process. The DCMD daemon is then started and is executed throughout the life of the operating system instance.

Figure 9A:
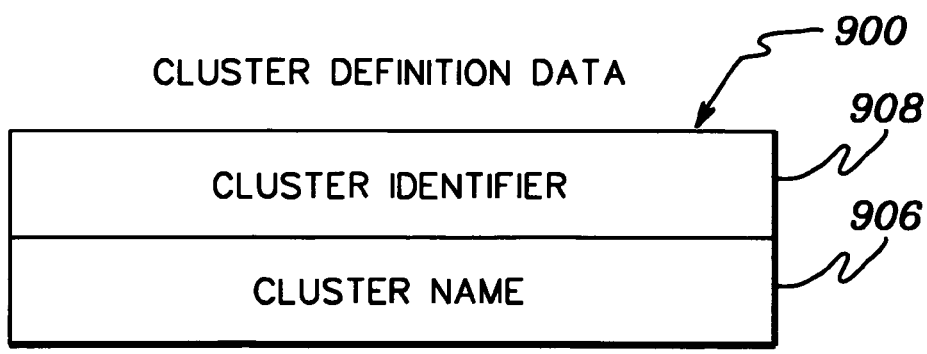
FIG. 9a depicts one embodiment of a cluster definition data structure, in accordance with an aspect of the present invention.
Figure 9B:
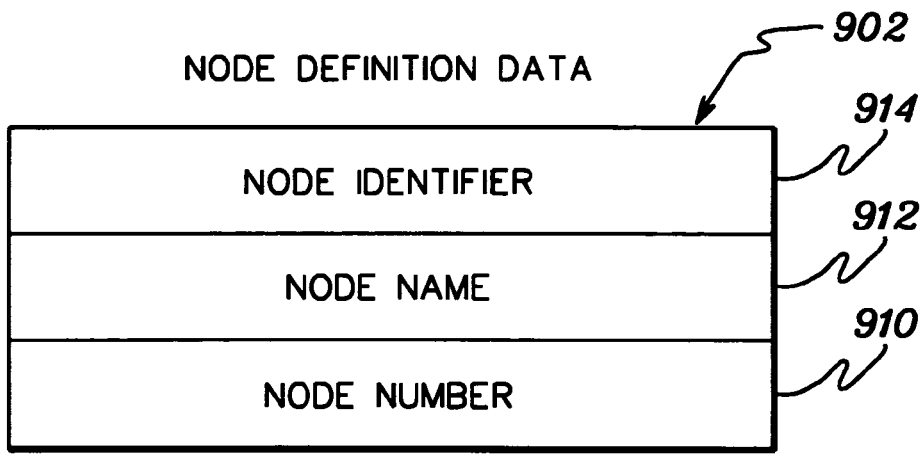
FIG. 9b depicts one embodiment of a node definition data structure, in accordance with an aspect of the present invention.
Figure 9C:
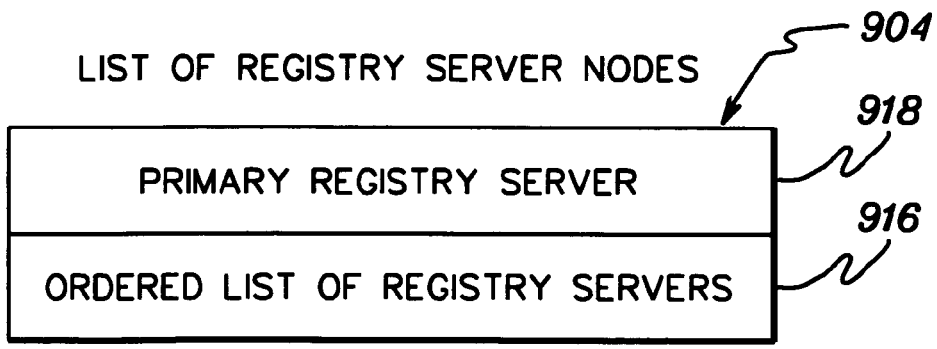
FIG. 9c depicts one embodiment of a list of registry server nodes, in accordance with an aspect of the present invention.

As previously mentioned, the DCM maintains a set of data structures stored in local storage of each node (as one example). The data structures include, for instance, a cluster data structure 900 (FIG. 9*a*), a node definition data structure 902 (FIG. 9*b*) and a registry server nodes data structure 904 (FIG. 9*c*), each of which is described below.

Cluster data structure 900 includes, for instance, a cluster name 906 and a unique cluster identifier 908. In one example, the unique identifier is used as a key field (unique field). The key field in the cluster data structure protects the individual instances of the operating system from being re-labeled with the same cluster names. The clusters are often created by human administrators, and could easily be labeled with identical names during the configuration process of a large number of processors. Furthermore, the cluster configuration infrastructure described herein is very dynamic, and thus, makes possible the creation and deletion of clusters. Clusters can be dynamically created and destroyed according to the needs of the distributed system. The unique identifier is generated at the time that the cluster is created, with a define cluster operation, described below. This feature makes possible the detection of the re-use of a cluster name. For example, if a cluster labeled A is created, deleted and created again, the data structures for these two definitions of A would be different, because the unique identifier fields would be distinct.

Further, the unique identifier in the cluster definition data structure is at the root of the mapping of the other cluster resources. In this system, the unique identifier for the cluster data structure is at the prefix of the label in the cluster resources. The use of the unique identifier mapping, and the architecture described herein, prevents cluster resources from being accessed by clients, which are under the wrong assumption of the cluster configuration.

Node definition data structure 902 includes, for instance, a node number 910; a node name 912, which is used as a convenience to make the node identification easier to a human administrator, but it is not used by any of the cluster resource managers as a means of accessing the configuration of a node; and a unique node identifier 914 that identifies the definition of a node. The unique identifier is associated with the specific operating system instance. This identifier is generated every time that a node is defined to a cluster. This unique identifier makes it possible to make a distinction between two nodes with identical names and also between a node that has been defined to the cluster, undefined, and then defined again (re-defined) with the same name.

Registry server nodes data structure 904 includes a list of the registry server nodes that are defined to the cluster. In one example, this data structure includes an ordered list of registry servers 916 and an indication of the primary registry server 918. This list is retrieved by other cluster components, which desire access to a System Registry process in order to read global configuration data of the system, as described below.

In addition to the above local data structures, each of the cluster components maintains a local storage data structure, where each component is reserved space for storing information, which is relevant to the local node. One example of a local data configuration is depicted in FIG. 10 and described below.

Figure 10:
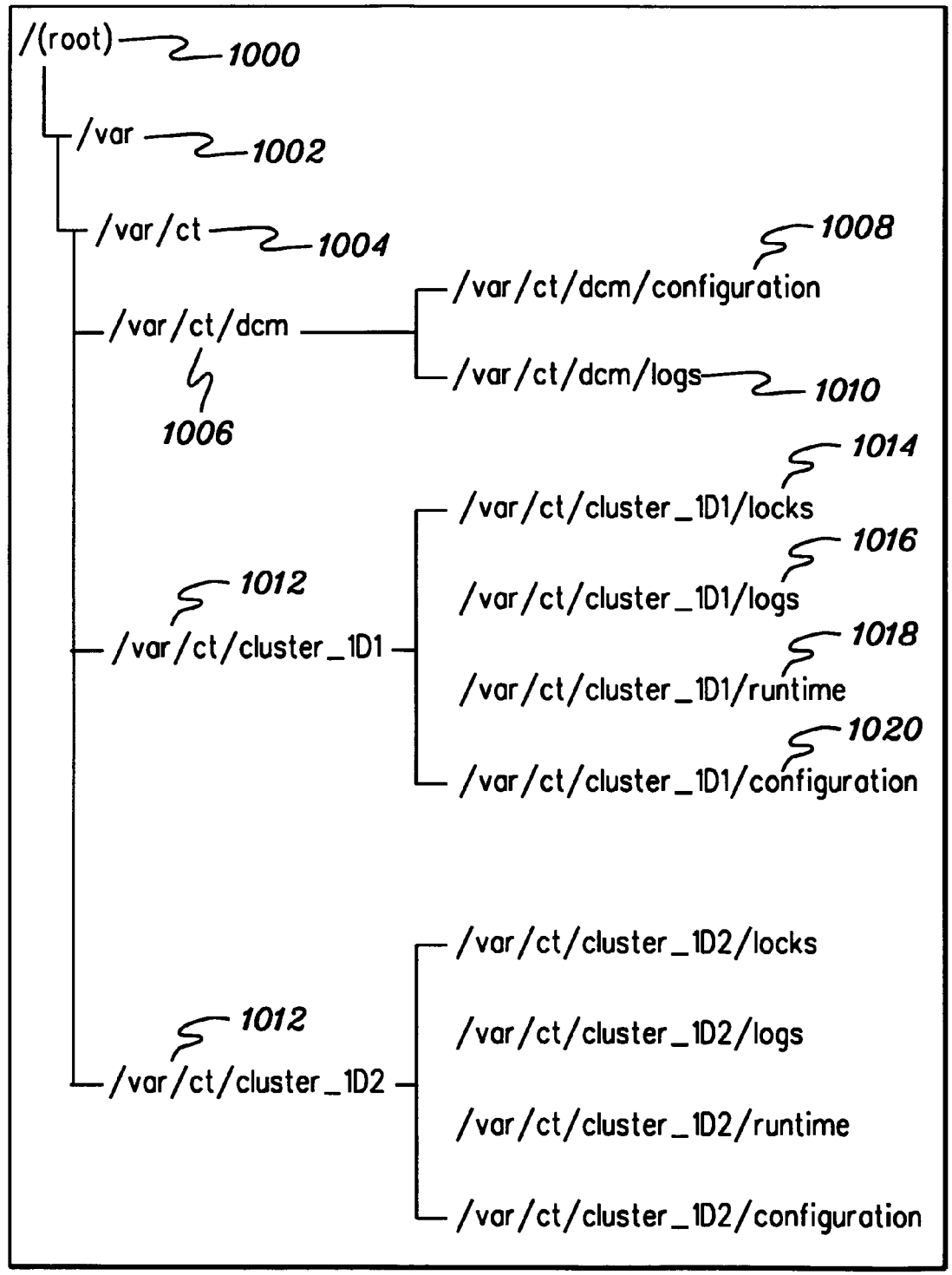
FIG. 10 depicts one example of local storage data fields, in accordance with an aspect of the present invention.

It should be noted that the data structure depicted in FIG. 10 was derived from a specific implementation of the present invention in the UNIX operating system, but that similar implementations in other operating systems are possible and do not depart from the spirit of this invention.

One example of the local storage data fields is described below:

1. The '/' (1000) denotes the root file system in the operating system.
2. '/var' (1002) is a file system where data related to operating system extensions are stored.
3. The cluster logic stores the local configuration information in '/var/ct' (1004).
4. The '/var/ct/dcm' directory (1006) is owned by the Distributed Configuration Manager component. In this example, the DCM component is the only component which has a higher level directory to store its own data, as opposed to storing it in a directory below a cluster ID, as the other cluster components. This is because, in this particular example, the DCM is the only cluster component which is aware that a node can be defined in more than one cluster.
5. In the '/var/ct/dcm/configuration' directory (1008), the DCM stores the list of the clusters to which the node is defined. It also stores in this directory the ID of the cluster to which the node currently belongs. This ID is used by the other cluster components in order to determine from where to read the local configuration data.
6. In the '/var/ct/dcm/logs' directory (1010), the DCM component stores its runtime log, which is used as an auditing facility.
7. For every cluster that a node is defined to, the DCM creates a directory under '/var/ct', labeled '/var/ct/cluster ID' (1012), where the literal "cluster_ID" is substituted by the unique cluster identifier, as explained below. Under this directory, the DCM also creates four other directories where the other cluster components can store their runtime locks 1014, runtime logs 1016, runtime core information 1018, and configuration data 1020.

In addition to the local configuration data, the DCM also stores global configuration data. The global configuration data, which is stored in the Server Repository, includes, for instance, a copy of the cluster definition data structure, as well as a copy of the node definition data structure. The values of the fields of the cluster data structure and node definition data structure are set at the time that a node is defined to the cluster, and should remain consistent. During processing, the data fields of the local data structures are compared to the data fields of the global data structure. If the comparison yields any differences, this may indicate that the node definition is no longer valid in the cluster.

Returning to FIG. 8, after the DCMD process is started, the DCMD process starts the System Registry process and the nodes, which were configured as registry server nodes (Step 1). This step satisfies the bootstrapping requirement of the System Registry component.

In Steps 2–4, the DCMD daemon starts the Liveness component, Group Services component and Resource Manager component in, for instance, all of the nodes of the cluster.

Then, at Step 5, the System Registry subsystem performs the first phase of its initialization. In particular, it performs a procedure that retrieves the most recently available copy of the global configuration database. During this phase, the System Registry processes, which were bootstrapped by the DCMD, exchange messages, which contain the incarnation number of the global configuration database. The System Registry component then selects the copies of the configuration database, which have the highest incarnation number. These copies are allowed to proceed with the second phase of the component's initialization, as described below.

After the completion of the first phase of initialization, the System Registry component allows the other components to issue operations of type read, which enable the other core cluster components to complete their initialization. That is, after the first initialization phase is complete, the System Registry subsystem is now capable of serving the global cluster configuration data to the other cluster components. The System Registry component allows the other components to read the global configuration data, but does not allow any modifications to the global configuration. This is because any modifications to the global configuration data is performed through write operations, and the System Registry component has a dependency on the Group Membership function in order to perform write operations. For this reason, any operations that modify the global cluster configuration data need to wait for the completion of the second phase of the System Registry initialization, described below.

At Step 6, the DCMD can now read the global cluster configuration data from the System Registry. Thus, at Step 7, it is able to verify if the local configuration that it stores in each node is consistent with the global cluster configuration stored in the System Registry. The DCMD component cannot yet at this point make any changes to the global cluster configuration, because the System Registry is not yet able to write operations. Nevertheless, it can determine if the local configuration is consistent with the global cluster configuration, and then continue with the cluster bootstrapping process and start the other components, which will eventually satisfy the other dependencies, such that the System Registry will in turn be able to complete the second phase of its initialization and become write enabled.

At Step 8, the Liveness component is to read the global configuration data. But first, it needs to know the location of a System Registry server, and that information is in the local cluster configuration. Thus, the Liveness component makes a call to the DCMD in order to retrieve this information.

At Step 9, in a procedure similar to the previous step, the Group Services component also retrieves the local cluster configuration data from the DCMD component.

At Step 10, the Liveness subsystem satisfies its dependency on the global configuration data by reading the global configuration data from a System Registry server. Further, at Step 11, the Liveness component has now fulfilled all of its dependencies and can now conclude its initialization and make available the liveness function to the other cluster components.

At Step 12, the Group Services component can also read the global configuration data from the System Registry. The Group Services component can now utilize the liveness function from the Liveness component, as indicated in Step 13.

At Step 14, the Group Services component completes its initialization, and is able to make the group membership function available to the other cluster components.

At Step 15, the System Registry component satisfies its requirement of membership services, which allows the System Registry to perform the second phase of the initialization procedure. In this phase, the copies of the global configuration database, which had a lower incarnation number as determined by the first phase, are updated using a membership service offered by the Group Services component. This allows the System Registry component to finish the second phase of its initialization and allows write operations to be issued against the global cluster configuration.

At Step 16, the System Registry component now concludes the second phase of its initialization. After this phase is complete, the System Registry component is able to use the membership services in order to perform replicated write operations, and therefore, allows other cluster components to make modifications to their global cluster configuration database.

At Step 17, the Resource Manager component retrieves the local configuration data from the DCMD component. The Resource Manager component reads the global configuration data from the System Registry and makes any modifications to it that are desired (Step 18).

Further, at Step 19, the Resource Manager component utilizes the member services of the Group Services component to determine the version number of its configuration database. The Resource Manager component now has all of its data and functional requirements fulfilled, and has completed its initialization (Step 20). Thus, the Resource Manager component can bootstrap any other configured resource controllers (Step 21).

The additional resource controllers read the local cluster configuration from the DCMD component (Step 22), and the global cluster configuration from the System Registry (Step 23). Further, they perform any desired modifications. At Step 24, the additional resource controllers conclude their initialization.

Subsequent to performing the above bootstrapping process, all of the cluster components are fully available and all of the data and functional requirements of the components are fulfilled.

In order to manage a cluster, various definition operations are employed, in accordance with at least one aspect of the present invention. These operations include, for example:

(A) A define cluster operation, which creates a new cluster definition. In particular, a new cluster identifier and a new local storage area for the storage of the local cluster configuration in the node where this operation is issued are created. This new local storage area is placed in a directory which has a new cluster identifier in the directory path. This operation also creates a new global storage area. The DCM component marks the node where this operation is issued as a registry server node. Also, in this process, the DCM component bootstraps the System Registry process and creates the global cluster data structures defined herein, as described above.

(B) An undefine cluster operation is used to erase a cluster definition. It erases the local cluster definition in all nodes which were defined to be part of the cluster. It also erases all of the copies of the global cluster storage, which is managed by the System Registry component.

(C) A modify cluster operation is used to modify attributes of the cluster definition. One attribute which can be modified is the cluster name. This attribute can be modified, since it is not used internally by the cluster components. Instead, it is the cluster id, which is used internally for the identification of the cluster.

(D) A define node operation is used to define a node to a cluster. The cluster has been previously established by the define cluster operation. A new local storage is created in the newly defined node. Also the cluster definition, which is stored in the global storage area, is updated with the new node definition.

(E) An undefine node operation is used to erase the node's definition from the global cluster configuration and global storage. It also erases the local storage in the node, which was associated with the definition of the node of the particular cluster.

(F) A define registry server node operation defines a particular node in the cluster as a registry server node. After this operation, the DCM component identifies the node as a registry server node, and bootstraps the registry server process in the node, when necessary and/or desired.

(G) An undefine registry server node is an operation that removes the node definition as a registry server node. After this operation, the System Registry process is no longer bootstrapped on that node.

(H) A modify node operation changes the attributes of a node definition, in both the global cluster configuration, as well as in the local storage. One attribute of a node's configuration which can be changed is the node's name.

In addition to the various definition operations, various control operations are used to manage a cluster, a node and a registry server. These operations include, for instance:

(A) An online cluster operation, which initiates a process in the node in order to attempt to contact all of the other nodes which are known to be defined to the cluster, and requests that they move to online.

(B) An offline cluster operation, which contacts all nodes which are known to be defined to the cluster, and requests that they move offline.

(C) An online node (join) operation, which requests the DCM process to move the node online to a specific cluster. This request makes the DCM component initiate the sequence of actions which were described above in the cluster bootstrapping procedure.

(D) An offline node operation requests a specific node to go offline. This operation requests the DCM component to stop all of the other cluster components which were running on the node.

(E) An online registry server operation requests the DCM component to bootstrap the System Registry process in a specific node.

(F) An offline registry server operation requests a DCM component to stop the System Registry process in a specific node.

Each of the above definition and control operations can be utilized in order to manage a cluster. One or more of these operations are described in further detail below.

Figure 11:
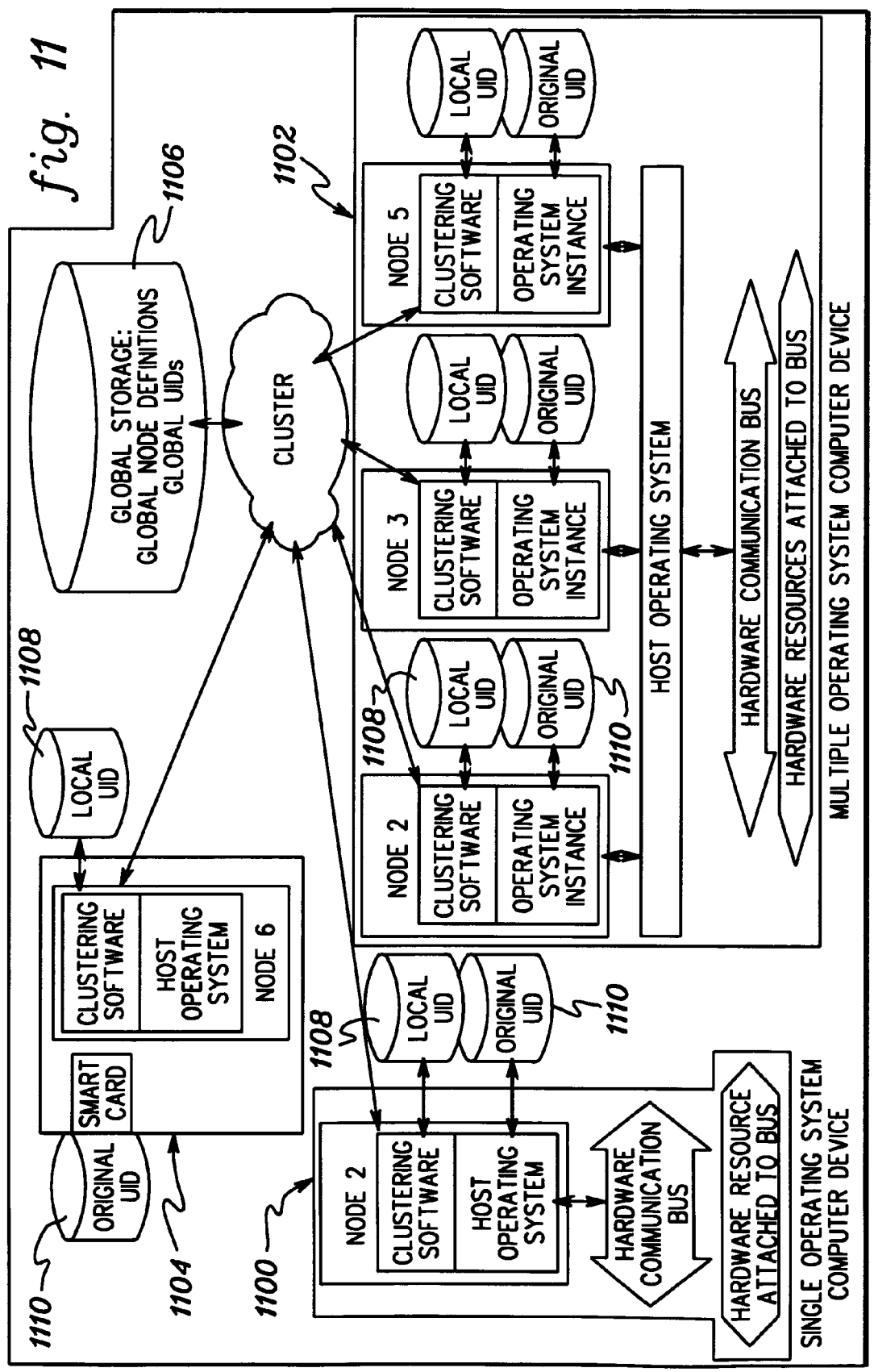
FIG. 11 depicts one embodiment of unique node identifiers of a clustered system, in accordance with an aspect of the present invention.

As described herein, in an aspect of the present invention, the cluster architecture utilizes a unique identifier, which is generated at the time that an operating system instance (i.e., a node) is defined to the cluster. The unique identifier is generated in such a way that it is meaningful to the implementation of the cluster system (see FIG. 11). For example, for a single operating system computer 1100, the unique identifier is derived, in one instance, from a number stored in read only memory (ROM) in the mother board of the system.

For a multiple operating system computer 1102, the operating system instance may just generate a unique identifier at the time that the node is defined, using a known unique identifier generation technique.

Further, for a computing device 1104 with a distinguished piece of hardware, the identity of the operating system is derived from the single piece of hardware. Such implementation is meaningful in a variety of applications, such as in devices which utilize smart cards for the identification of an authorized user.

The identifier is stored in both the local configuration storage, as well as in the global configuration database. Since both types of storage are used, a set of rules is provided, in accordance with an aspect of the present invention, to reconcile the data, if the data was to get out of sequence, for any reason (e.g., maintenance procedures). For example, if the out of sequence data is the node's identifier, then a set of rules is provided to reconcile the identifier. This particular example is described in further detail below. However, it should be recognized that similar rules are used to reconcile other inconsistent data.

Since a distributed cluster system is a set of machines, each of which may be disconnected from the communications network at different times, an instance of the operating system is identified at the time of its definition as a node of a given cluster. However, the instance of the operating system may halt due to power outages or maintenance operations, and it should be able to recognize itself as a member of a given cluster, if it has ever been defined as such. Thus, each time that a node joins the cluster, it checks if the unique identifier in local storage matches the global identifier for that node.

In particular, in one embodiment, the unique identifier is read by the operating system, during the basic bootstrapping process of the basic operating system. The basic operating system then passes the unique identifier to the Distributed Configuration Manager at the beginning of the cluster bootstrapping sequence. The Distributed Configuration Manager in turn stores this unique identifier at the time that it is defined to the cluster, both in global storage 1106 and local storage 1108. Each time that the Distributed Configuration Manager performs the operation of joining a node to the cluster, it checks the validity of the three different instances of the unique identifier, (i.e., the identifier passed by the operating system in the bootstrap sequence, referred to herein as the original copy (UID) 1110; the locally stored (cached) copy 1108; and the globally stored copy 1106.

During the process in which a node joins the cluster, the three identifiers are compared as follows:

1) The original identifier is compared to the local identifier; and
2) The local identifier is compared to the global identifier.

These comparisons may yield four different results, which are shown below:

| original UID = Local UID? | Local UID = Global UID? | Scenario Number and Action Taken |
|---|---|---|
| YES | YES | Scenario 1: Normal Case, proceed with join process |
| YES | NO | Scenario 2: complete node deletion |
| NO | YES | Scenario 3: correct node definition |
| NO | NO | Scenario 4: complete node deletion |

The Distributed Configuration Manager then adopts, for example, the following actions according to each of these scenarios:

Scenario 1: In this case, all three identifiers are the same, and therefore, the node definition is correct. This is the normal case. The other three cases only exist as a result of operations, such as maintenance operations, which affect the node definition.

Scenario 2: In this case, the original identifier is equal to the local identifier, but the local identifier is not the same as the global identifier. This occurs when a node definition is deleted, while the node is not connected to the cluster. Because the node is not connected to the cluster, it is not able to participate in the node deletion process. Therefore, the local data structures are not updated to the effect that the node has been deleted. When the maintenance on the node finishes and the node attempts to rejoin, it notices its own deletion, and is thus, able to clean up the local data definition to the effect that the node has been deleted from a particular cluster.

Scenario 3: In this case, the original identifier disagrees with the local identifier, and the local identifier agrees with the global identifier. Thus, the original identifier has been replaced in a maintenance operation, for instance. This occurs when the original identifier is obtained from a hardware resource, which had to be replaced. Examples of such resources are smart cards and mother boards that have their unique identifiers stored in read only memory (ROM). If it becomes necessary or desirable to substitute the hardware where the original identifier is stored, then the cluster logic is to distinguish this case from an incorrect definition as in Scenarios 2 and 4. In this case, the local and global identifiers agree, which indicates that the node definition is still valid in the cluster. Therefore, the action taken is to correct the node definition to the effect that the original identifier has been replaced. Thus, the Distributed Configuration Manager changes both the local and global identifiers to agree with the new original identifier.

Scenario 4: In this case, the original node identifier does not agree with the local identifier, and the local identifier does not agree with the global identifier. Thus, the node has been subject to two maintenance operations. It has been deleted from the global configuration, while the node was disconnected from the cluster, and the original identifier has also been replaced. This case is analogous to Scenario 2 above, because the determining factor is that the global configuration does not agree with the last cached value in the local storage. Therefore, the action taken is to clean up the local data definitions to the effect that the node has been deleted from the cluster.

In one embodiment, in certain scenarios, such as Scenario 3, the Distributed Cluster Manager is able to perform an automatic correction of the original identifier, which is a desired effect in the case that the unique hardware which identifies the cluster is replaced in a maintenance operation. This feature could allow, for example, for another smart card to be used in the case of the loss of a previous card. The Distributed Configuration Manager is able to identify the machine that had been previously defined to the cluster by consulting the value in the global database. It would not, however, allow for a new card to be used in a machine which has never before been defined to the cluster, as illustrated in Scenario 4. This feature is also desired, since the cluster definition operation is an explicit operation that any machine that is to be defined to the cluster is to execute.

Further details regarding maintaining data consistency, for reliably defining a node as a member of a cluster system, and for joining a cluster are described below.

Since changes are made to both the local configuration and the global cluster configuration databases, and since the data in both repositories is to be kept consistent, operations, such as the node define operation, are performed in an atomic manner (i.e., the operation is either performed to completion or aborted). If the operation is aborted, the data in both repositories is reverted to a state which is consistent with the clustering architecture. This takes into account that a node may be defined and undefined several times, and that the node may be disconnected from the cluster, when an undefine operation occurs.

In order to enforce the consistency of the node definition to a cluster, the node definition operation has the node itself participate in the node definition protocol. During this operation, the unique identifier of the node is associated with a node number, which is also unique to the particular cluster to which the node is being defined. The node number is not, however, unique across all clusters. Thus, when a pool of nodes is utilized for multiple cluster deployment (described below), it is possible that a node may be defined with the same or a different number in each cluster. However, in this embodiment, a node can be online (active) in only one cluster, at any specific point in time.

The node number identifier is an internal identifier with which the node is known to the cluster. The node definition process ensures, in one example, that a given node number is associated with an instance of the operating system, which was originally defined with a specific unique identifier. Further details of the node definition process is described with reference to the example depicted in FIGS. 12 and 13.

Figure 12:
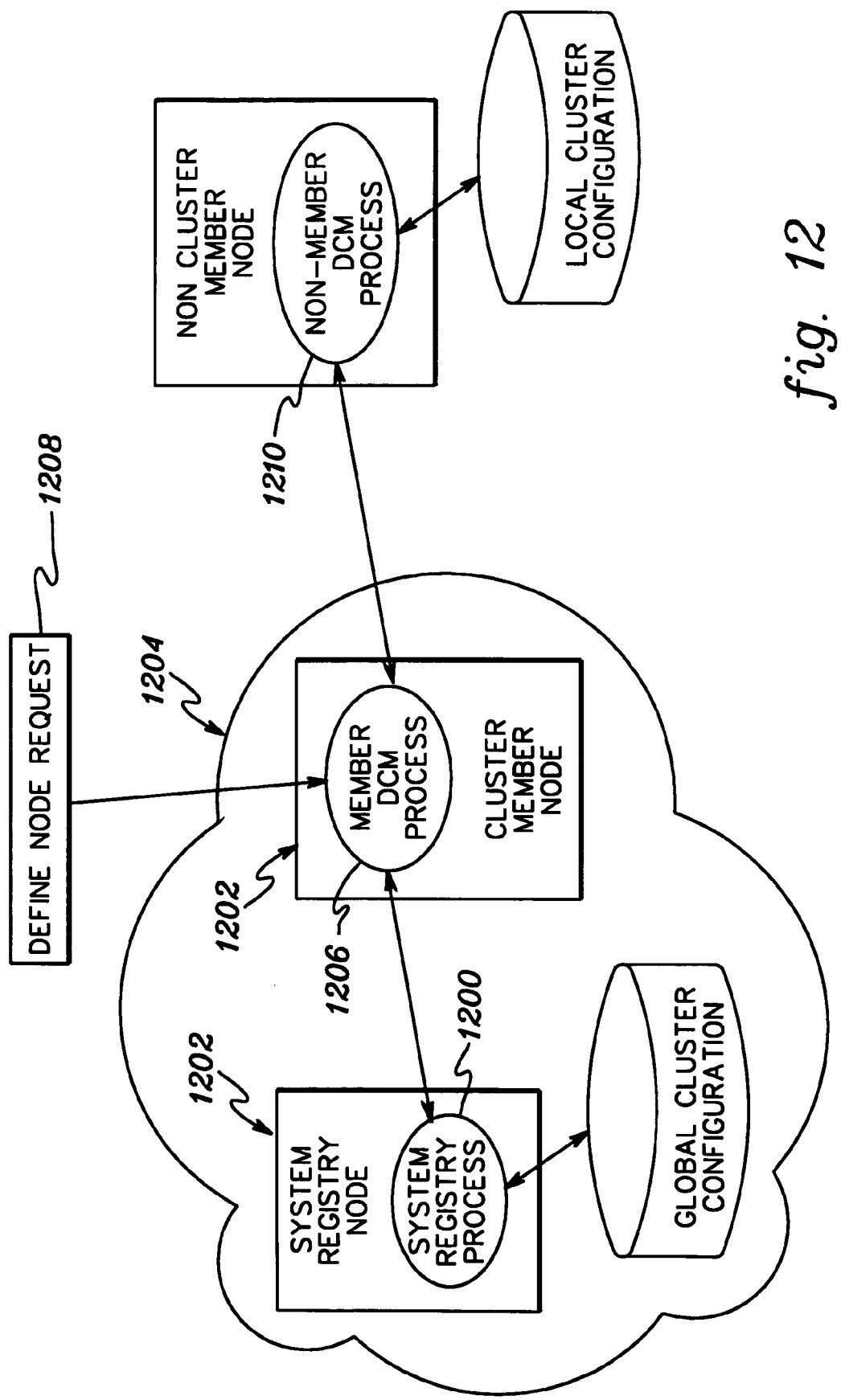
FIG. 12 depicts one embodiment of the processes that participate in a node definition process of the present invention.
Figure 13:
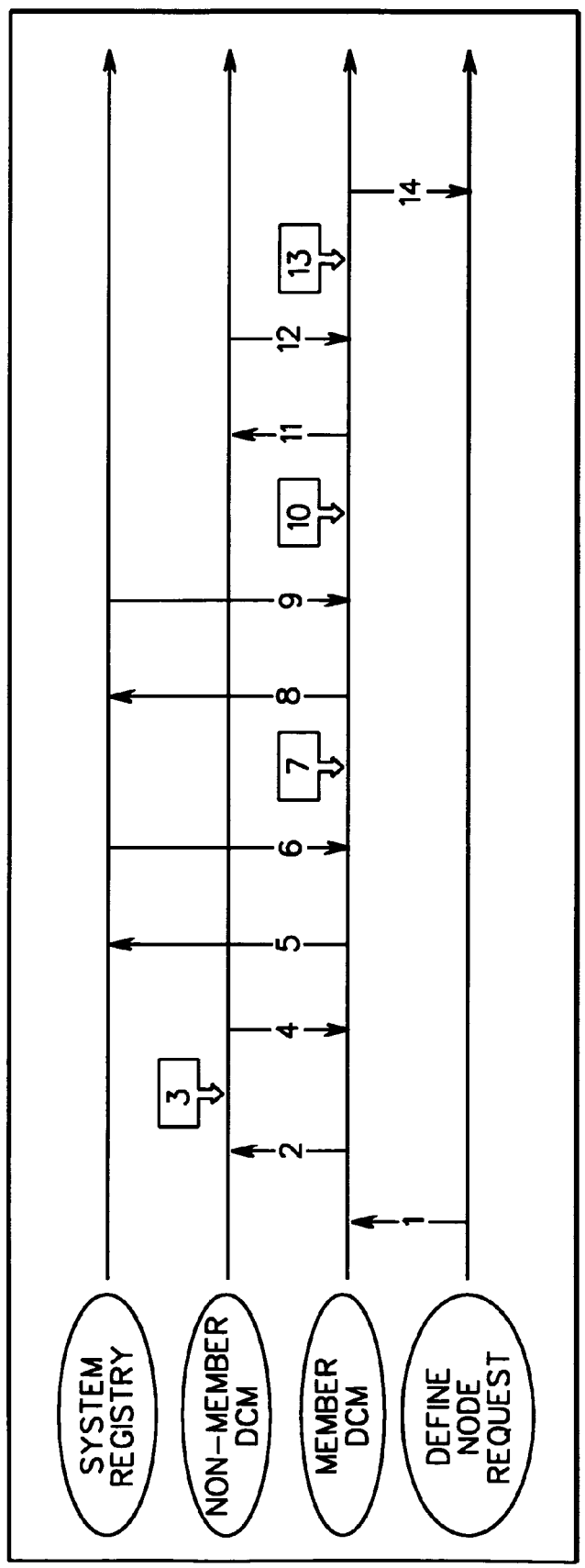
FIG. 13 depicts one embodiment of the sequence of events and message flow of a node definition process, in accordance with an aspect of the present invention.

Referring to FIG. 12, there are three processes (e.g., computer programs), which participate in the node definition process: a System Registry server process 1200 (FIG. 12), which is located in one or more nodes 1202 of a cluster 1204, which is defined as a registry server; a Distributed Configuration Manager 1206, which is running at the node where the node definition request 1208 is issued, or the node to which the operation is routed (i.e., member DCM process); and a Distributed Configuration Manager 1210, which is running in the node that is being added to the cluster (i.e., non-member DCM). These three processes participate in the define protocol, as described below with reference to FIG. 13.

At Step 1, a define node request is passed to the member DCM process. In one example, passed with the request is the node (e.g., IP) address of the node to be defined. A unique node identifier, node number and node name may also be passed, as optional parameters. If not explicitly set, values are generated by the member DCM process for a unique identifier, node number and node name.

The node address obtained in Step 1 is utilized by the member DCM to contact the non-member DCM process (Step 2). In this message, the member DCM process passes the cluster identifier to the non-member DCM process.

At Step 3, the non-member DCM process receives the request to be defined as a member of the cluster, which is identified by the received cluster identifier. The non-member DCM checks that it has no local configuration identified by the unique cluster identifier already. (In some of the scenarios discussed above, it is possible that the node has an old definition.) The non-member DCM replies to this request with its own unique identifier, that was passed by the host operating system. It also includes in this reply a status code which denotes if a previous definition for that cluster ID was found in local storage.

The member DCM receives the reply from the non-member DCM (Step 4), which contains the unique identifier of the non-member DCM node. It saves this value and checks if the node identifier was reported in the global storage (Step 5). For example, the member DCM makes a lookup request to the System Registry process to find any node in the cluster defined with the specific unique identifier. The System Registry replies with a message that contains a possible node definition that corresponds to the unique node identifier passed in Step 4, or with a return code that denotes that no such definition exists (Step 6).

At Step 7, the member DCM receives the message described above. If such a definition is found, the member DCM checks if this definition is the same as the one reported by the non-member DCM. If these definitions are identical, a message is sent back to the node definition requester to the effect that the non-member node is already defined to the cluster (the define node request was issued in error, and the "nonmember" label in this case is not appropriate). If the definitions are not identical, both the local and global definitions are deleted and the define node process continues. The remaining possibility is that the non-member node reports a local definition that cannot be found in the global cluster configuration. In this case, as in the case that the definitions do not match, the non-member DCM is requested to erase the previous definition.

In Step 8, the member DCM requests the System Registry to make an entry for the new node, passing to it the unique node identifier, node number, node name and the node address, which was originally given in Step 1. The System Registry commits the entry described above to the global cluster configuration and sends a message back to the member DCM informing of the success of the operation (Step 9).

At Step 10, the member DCM receives the message above. If the operation was not successful, the node definition process is aborted, and a message is sent back to the requester of the node definition that the process failed. Otherwise, the process continues. The member DCM now requests the non-member DCM to commit the new node definition to local storage, and to erase any previous definition, if appropriate (Step 11).

At Step 12, the non-member DCM performs the request described above, and send a message back to the member DCM informing of the success of the requested operation. The member DCM receives the message (Step 13). If the result reported by the non-member DCM is a failure, then the member DCM aborts the definition operation, and reports a failure to the requester of the node define operation. The member DCM also attempts to erase the definition in the global storage that was made in Step 8. Otherwise, the process continues.

The member DCM process has successfully completed the node definition operation and now returns a message to the requester indicating the success of the operation (Step 14).

Subsequent to defining a node to a cluster, the node can be inserted (join) into the cluster without requiring any additional action on the part of the system administrator by using, for instance, an automatic cluster configuration technique of the present invention. This technique may be initiated, for example, immediately following the node definition, or at the time that an online node request is issued.

One embodiment of an automatic cluster configuration technique is described with reference to FIGS. 14 and 15. Specifically, FIG. 14 depicts one example of the various processes used by the technique, and FIG. 15 depicts one example of the message flow between the processes.

Figure 14:
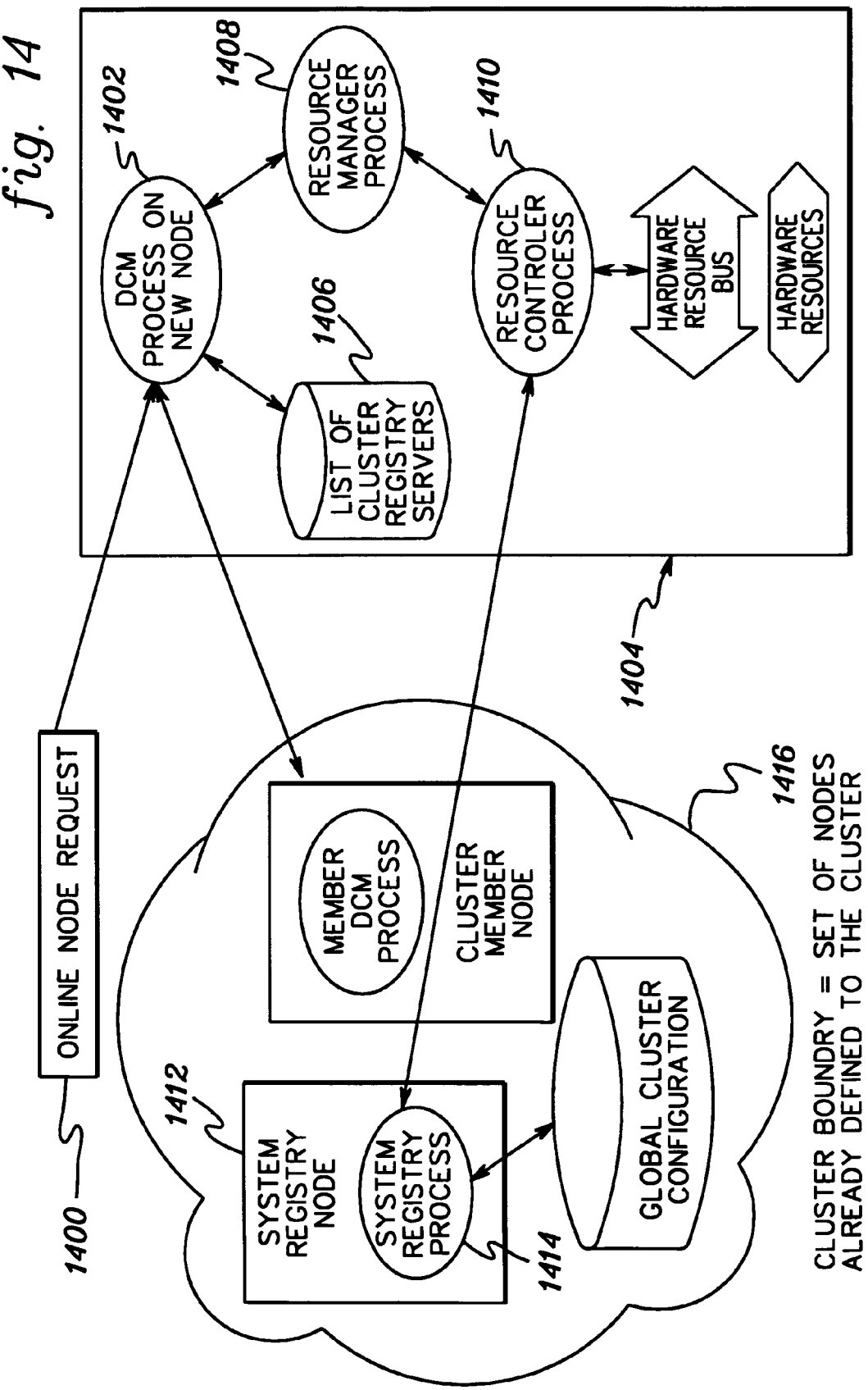
FIG. 14 depicts one example of the various processes used by an automatic cluster configuration technique of the present invention.

Referring to FIG. 14, the action that configures the new node to the cluster, pursuant to, for instance, an online node request 1400, is coordinated by DCM process 1402 on new node 1404. This is because the other processes in the cluster do not have any knowledge of the node's configuration, until it joins the cluster for the first time.

Figure 15:
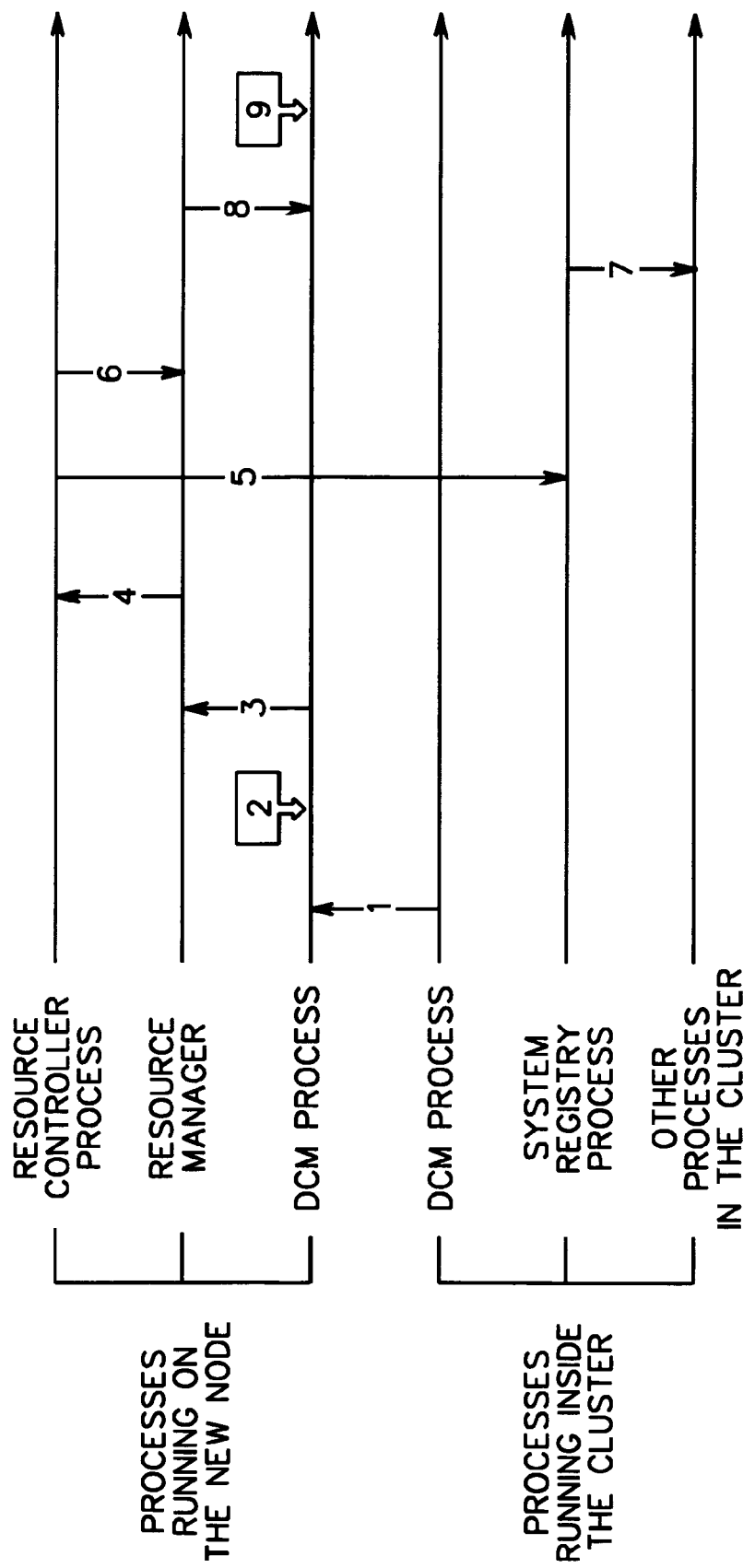
FIG. 15 depicts one example of the message flow between the processes of FIG. 14 to provide the automatic cluster configuration of the present invention.

At the time of the node definition, only a minimal amount of data is exchanged between the new node and the cluster (Step 1, FIG. 15). The data exchanged is concerned with guaranteeing a unique identifier for the new node, and also to seed the list of registry servers 1406. The local identifier/node number pair is compared to the identifier/node pair of the global repository. When the comparison is successful, the join can proceed.

When the new node is requested to join the cluster (Step 2, FIG. 15), the DCM process on the new node requests Resource Manager 1408 in the new node (Step 3, FIG. 15) to send a message (Step 4, FIG. 15) to resource controllers 1410 to write their configuration in System Registry 1412. This process is repeated each time that the node joins the cluster, and also allows for automatic updates of the node configuration to be made.

Thereafter, the resource controllers update the System Registry (Step 5, FIG. 15) with the configuration for the resources (e.g., hardware) that they control, and notify the Resource Manager on the new node (Step 6, FIG. 15) that the update is complete. The Resource manager process then notifies the DCM (Step 8, FIG. 15), when it receives the completion status for this operation for the resource controllers that are registered with it.

The DCM process on the new node receives (Step 9, FIG. 15) the notification from the Resource Manager that the update is complete, and continues with the join process.

In a parallel action, System Registry process 1414 on cluster 1416 sends an event (Step 7, FIG. 15) that can be received by event subscribers to the effect that the configuration has been updated. In the case of the addition of a node to the cluster for the first time, this event makes possible for the other cluster components to recognize the new node as a cluster member.

The above procedure allows for a node to configure itself as a member of the cluster without requiring any information from the system administrator. The administrator only supplies, in one example, a node address for the node define procedure. During the node define procedure, the list of registry servers is seeded into the new node. When the new node is requested to join the cluster, it uses the list of registry servers to find a working System Registry process. Then, the resource controllers on the new node are requested to discover the configuration of the resources that they control and to write this information in the global cluster configuration database. (The resource controllers are processes, which are written for specific resources and know how to discover their configuration.) Advantageously, this operation is initiated by the new node, and does not require the system administrator to provide this information manually.

In one example, the above procedure is repeated each time that a node joins the cluster, in order to ensure that the node's configuration is consistent with the global repository. For instance, this procedure allows a system administrator to disconnect a node from the cluster, add some hardware, such as new communications adapters, make changes to the node's configuration, and then reconnect it to the cluster without having to notify the cluster of any of the changes made while the node was offline from the cluster.

Figure 16:
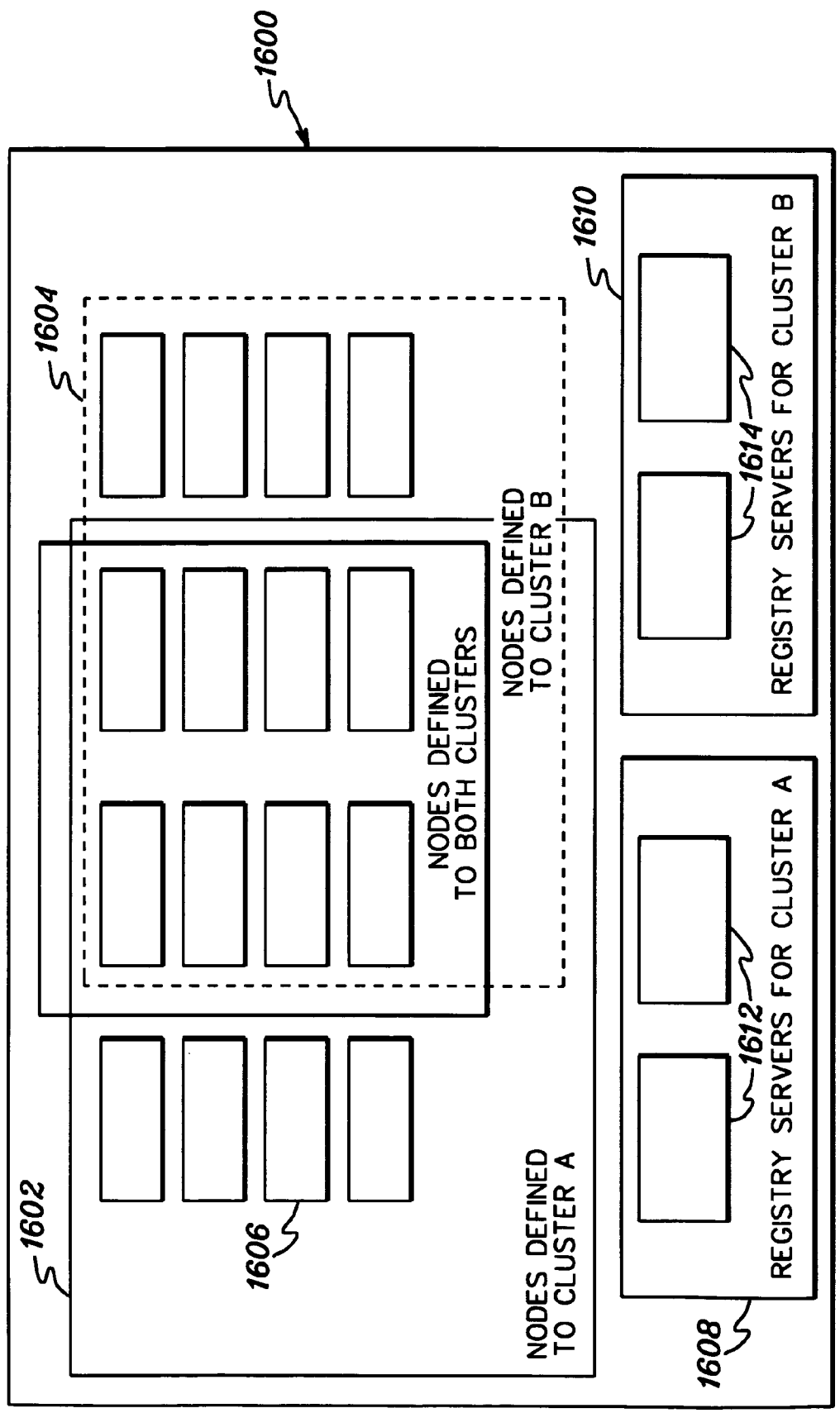
FIG. 16 depicts one example of nodes being defined to a plurality of clusters, in accordance with an aspect of the present invention.

In accordance with at least one aspect of the present invention, a computing environment can have one or more clusters defined therein. For example, a computing environment 1600 (FIG. 16) includes Cluster A 1602 and Cluster B 1604. Each of the clusters has defined thereto one or more nodes 1606. Further, one or more nodes may be defined to both clusters, as shown in FIG. 16.

Each cluster has one or more registry servers associated therewith. For instance, Cluster A has registry servers 1608 and Cluster B has registry servers 1610. Registry servers 1608 include one or more server nodes 1612. Similarly, registry servers 1610 include one or more server nodes 1614. One or more of the server nodes of one set of registry servers can overlap one or more nodes of another set of registry servers.

In a further aspect of the present invention, a node can be quickly moved from one cluster into another. This capability makes it possible to shift nodes among the workload that a cluster is experiencing at any given moment. For example, consider an enterprise that has a pool of nodes that are to be used for two different applications, such as web serving and database services. Using the clustering technique of the present invention, the enterprise would be able to define two clusters, Cluster A and Cluster B, each dedicated to one application. Now, assume that the workload in these applications varies according to the time of day, in which web serving is more active during the day and database services is more active during the night. The enterprise would like to move a few nodes from Cluster A into Cluster B, when the load in Cluster B is greater, and vice versa.

In traditional clustering systems, the system administrator would have to first move the node offline in Cluster A, then undefine the node in Cluster A and then define it to Cluster B (usually requiring a great deal of manual configuration), and then moving the node online in Cluster B. The traditional system involves manual intervention and is very time consuming. The time that is spent in the process of moving a node is very important when considering workload balancing applications, because typically, the workload is a very dynamic measurement, that changes not only between night and day, as in this example, but in a matter of minutes. Thus, the operation that moves a node from one cluster to another is to be very fast, in order to have value in workload balancing applications.

Therefore, in accordance with an aspect of the present invention, a node is moved from one cluster into another cluster rapidly by allowing overlapping cluster definitions. That is, a node is allowed to be defined to more than one cluster, although, in one embodiment, it is only active in a single cluster at any particular point in time.

When a node is defined to a cluster, the DCM makes a special storage area where it keeps the local configuration for the cluster to which the node has just been defined. The DCM component stores the local cluster configuration in this local storage area. Among the values stored in the local cluster configuration are, for example, the cluster name, the cluster id, the node name, the node id and the list of registry servers for the particular cluster. As a further example, the DCM also keeps the following two fields in local storage: The current cluster pointer, which contains an identifier (id) of the cluster of which a node is currently online; and a target cluster pointer, which contains the id of the cluster to which the node is moving.

The value of these pointers is only different during the operation that moves the node from one cluster into another. In order to be able to move a node into a certain cluster, at least one registry server node for that cluster is to be online. In order to move a node, the DCM moves the target cluster pointer to point to the cluster to which the node is supposed to join, and then sends a refresh signal to the other cluster components, which are running in the node being moved. When the refresh signal is received by a component, the component refreshes its configuration, i.e., it reads its configuration again from the global cluster repository. In order to reach the repository, the components retrieve the list of registry servers that are defined to the specific cluster. The process that retrieves the list of registry servers in the node being moved utilizes the target cluster pointer in order to decide which list to use, as described further below.

Figure 17:
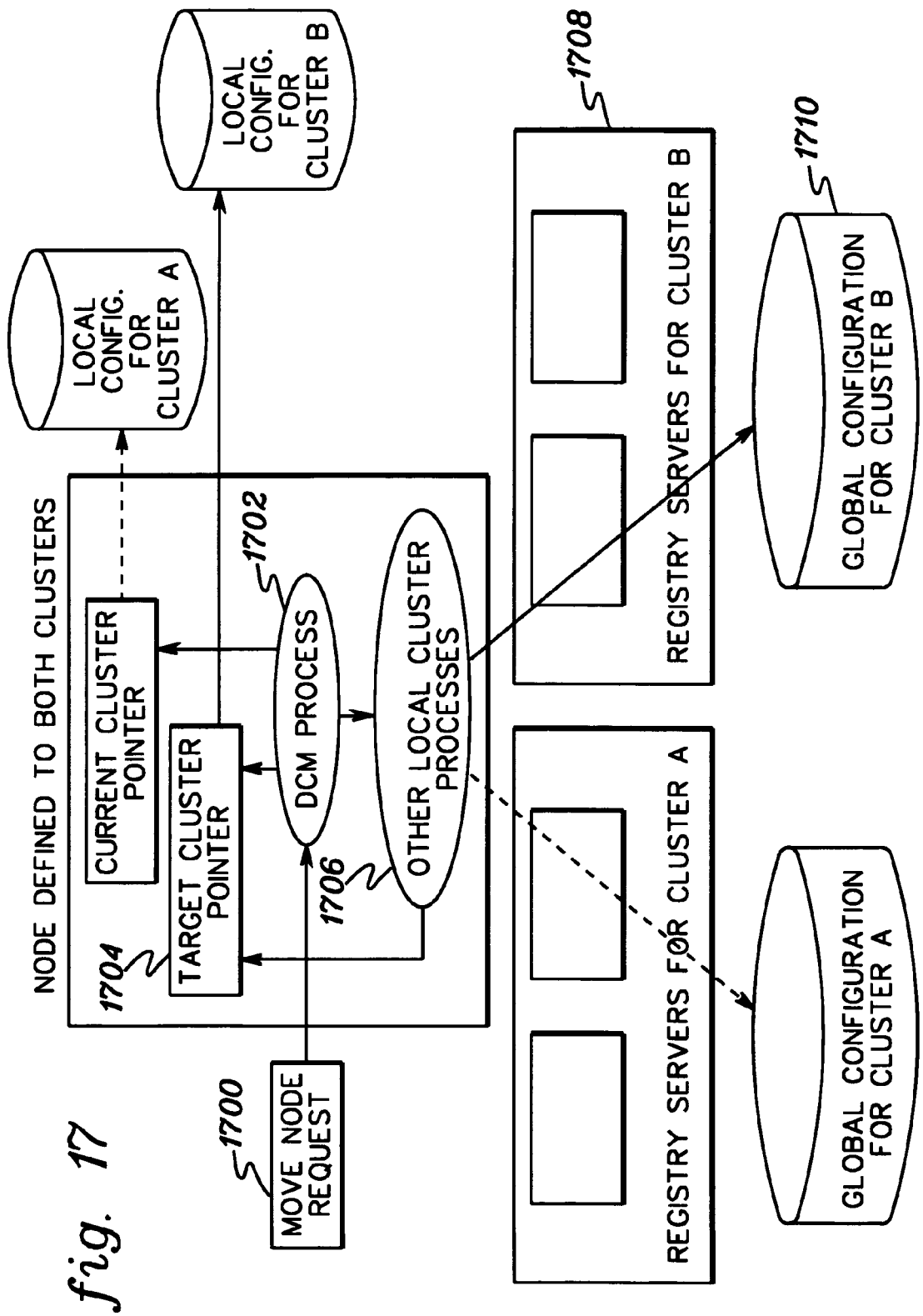
FIG. 17 depicts one example of a node moving from one cluster to another cluster, in accordance with an aspect of the present invention.
Figure 18:
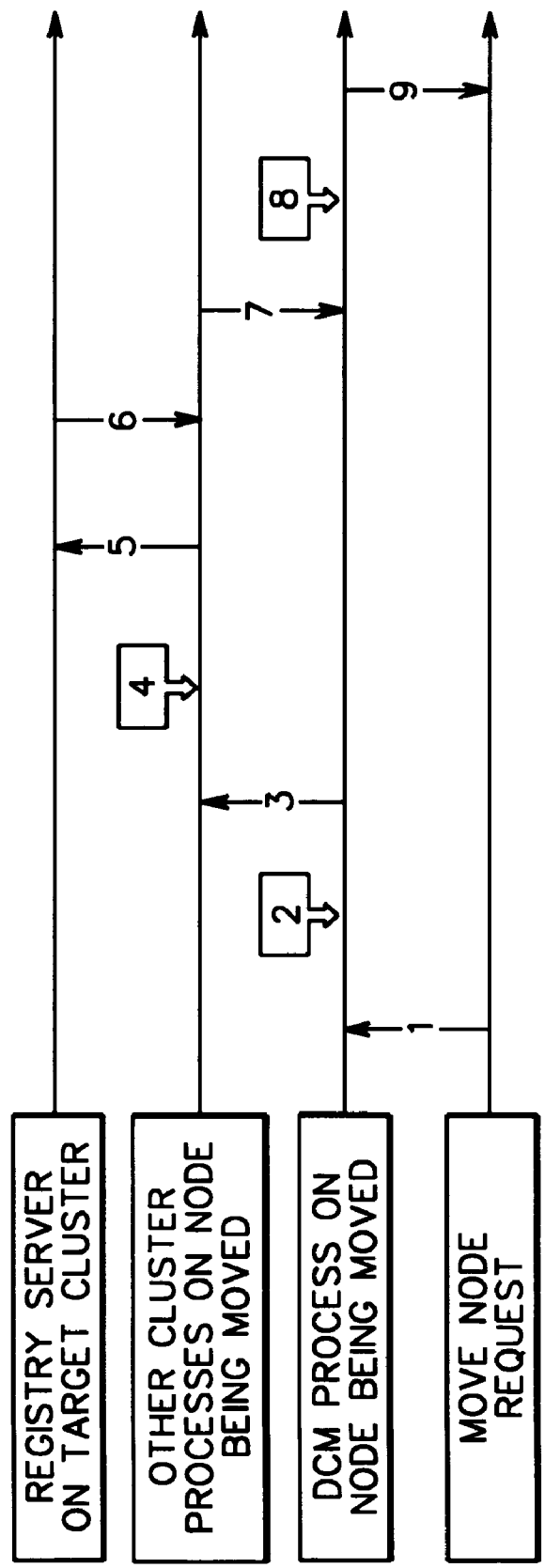
FIG. 18 depicts one embodiment of the sequence of events and message flow for processes to move from one cluster into another cluster, in accordance with an aspect of the present invention.

One embodiment of the logic associated with a node moving from one cluster into another cluster is described below with reference to FIGS. 17 and 18. The dotted arrows in FIG. 17 indicate the previous connections of system components to the configuration of Cluster A (both local and global). During the move process, these arrows are substituted by the solid arrows that point to the configuration of Cluster B.

At Step 1 (FIG. 18), a request 1700 (FIG. 17) to move a node to a different cluster is sent to DCM process 1702 on the node that is to be moved. The DCM process receives the request (Step 2, FIG. 18) to move the node, and changes the value of the target cluster pointer 1704, such that it contains the cluster ID of the cluster into which the node is being moved. The DCM process on the node being moved sends a refresh message (Step 3, FIG. 18) to other cluster components 1706, which are running on that node.

The other cluster components retrieve (Step 4, FIG. 18) the list of registry servers 1708, such that they can read global cluster configuration 1710. This list is retrieved using a mapping, which associates the cluster ID stored in the target cluster pointer with the list of registry servers for that specific cluster. Then, the other cluster components request (Step 5, FIG. 18) their specific configuration, which is stored in the global registry, using a registry server listed in the list of registry servers received in the previous step.

The registry server provides (Step 6, FIG. 18) the other cluster components in the node being moved with their appropriate configuration for their role in the target cluster. The other cluster components on the node being moved notify (Step 7, FIG. 18) the DCM process that they have completed the move operation, and they are now online in the target cluster.

The DCM now changes (Step 8, FIG. 18) the value of the current cluster to reflect the fact that the node has successfully been moved to another cluster. Otherwise, if any of the cluster components fail to perform the refresh operation, then the DCM moves the node back to the previous value of the current cluster pointer, and also reverts the value of the target cluster pointer, and reissues the refresh message, effectively undoing the effect of the move. Subsequently, the DCM process notifies (Step 9, FIG. 18) the requester of the move operation of the outcome of the operation.

When all the components report back to the DCM that they finished the refresh operation and are successfully online in Cluster B, the current cluster pointer is moved to point to Cluster B. If the node is unable to join Cluster B for any reasons, then it reverts back to the cluster, which is named in the current cluster pointer.

The above procedure makes possible the very quick movement of a node from one cluster into another. The reason that such fast movements are possible is due to the fact that this architecture allows for a node to be defined in multiple clusters.

The various components of the cluster architecture send and receive messages and overall cause system communications traffic. The term "system communications" is used herein to reference network traffic that is generated by the clustering logic itself, as opposed to the service traffic, which is the traffic generated by applications which run in the clustered system. For example, system traffic includes the network traffic that is generated by the Liveness subsystem, which sends periodic verification messages to its peers on every node. A further example includes the network traffic that is generated by the System Registry component, which sends the global configuration of the cluster to the other components. In typical deployments of the cluster system, more than one interconnecting network is utilized, resulting in multiple communications paths between the nodes. Thus, it is desirable to offer a facility to the system administrator in which the system traffic can be confined to specific communications paths, such that it does not interfere with the other applications running in the system.

In accordance with one aspect of the present invention, in order to control the network traffic generated by the clustering logic, the cluster architecture defines network objects. Each cluster component, which generates system traffic, specifies a preference for the network objects to be used for such traffic. For example, a cluster may include one or more networks, in which each network includes one or more subnetworks, and each subnetwork includes one or more nodes.

As described above, a node is defined to a cluster by a define node operation. Likewise, a subnetwork object is defined by a define subnetwork operation. A subnetwork can be implicitly defined by the DCM process, if it receives notification that a new communications adapter has been discovered in the cluster whose node address is not mapped to any existing subnetwork object. Further, an undefine subnetwork operation deletes a subnetwork definition from the global cluster configuration; and a modify subnetwork operation modifies attributes of a subnetwork definition. Attributes which can be modified include, for instance, the subnetwork name, as well as the network definition to which the subnetwork is mapped.

Similarly, a define network operation creates a network definition, which is mapped to one or more subnetwork definitions; and an undefine network operation erases a network definition from the global cluster database. Further, a modify network operation is used to modify attributes of a network definition. One attribute that can be changed is, for instance, the network name.

Each node, subnetwork and network is defined by at least one corresponding data structure, as described below. These data structures are stored, for instance, in the global repository.

Figure 19:
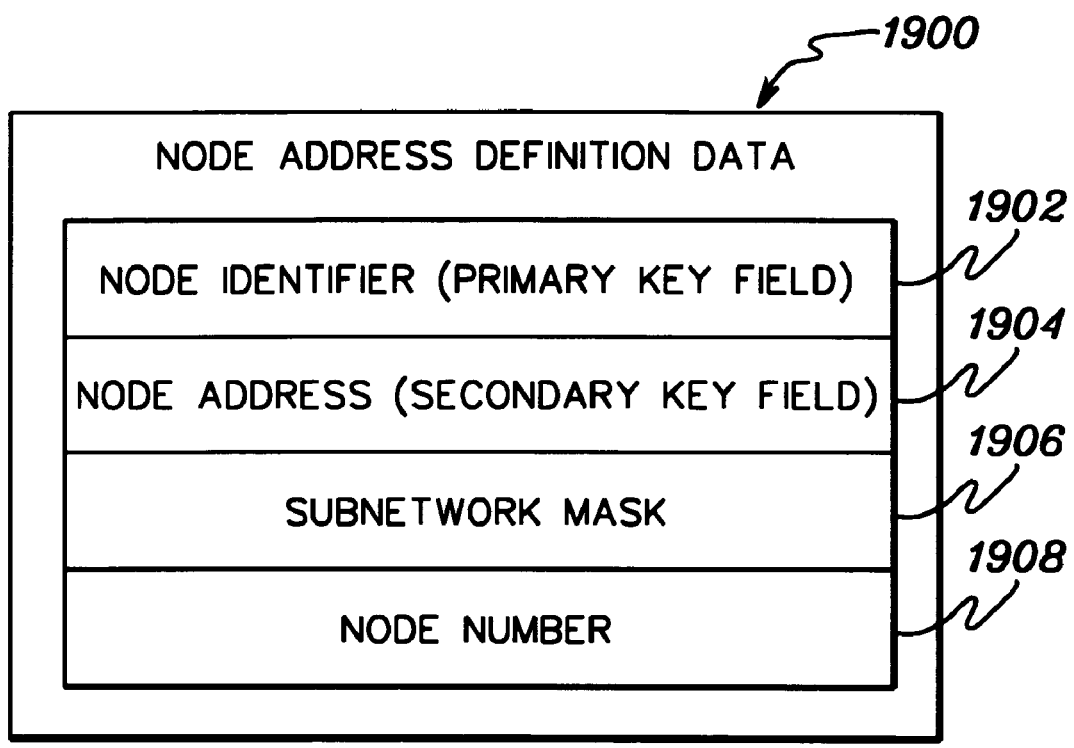
FIG. 19 depicts one example of a node address definition data structure, in accordance with an aspect of the present invention.

In one embodiment, each node is represented by one or more node address definition data structures. In one example, a node address definition data structure 1900 (FIG. 19) includes a unique identifier 1902, which is used as the primary key field of the node address data definition. It is generated at the time the node address object is created, as described herein; a node address 1904 (further described below), which includes a node address of a node interface used to reach the node; a subnetwork mask 1906, which is used to map the node address to a specific subnetwork of the cluster system; and a node number 1908, which includes the number of the node which is associated with the node address in field 1904.

The node address is a secondary key field, which is also unique. The node address is unique because the Distributed Configuration Manager component does not allow for the definition of two node addresses which have the same node address. In the examples described herein, the addresses are internet protocol (IP) addresses, since in one particular implementation of aspects of the present invention, the internet protocol is used as a means of communication between the nodes. However, it is understood by those skilled in the art that any other communications protocol can be utilized. In any event, there is to be at least one address which is identified for each node, such that the node can be reached using the chosen protocol. If more than one communications protocol is utilized, then the protocol type may be an additional field of the node address definition.

Figure 20:
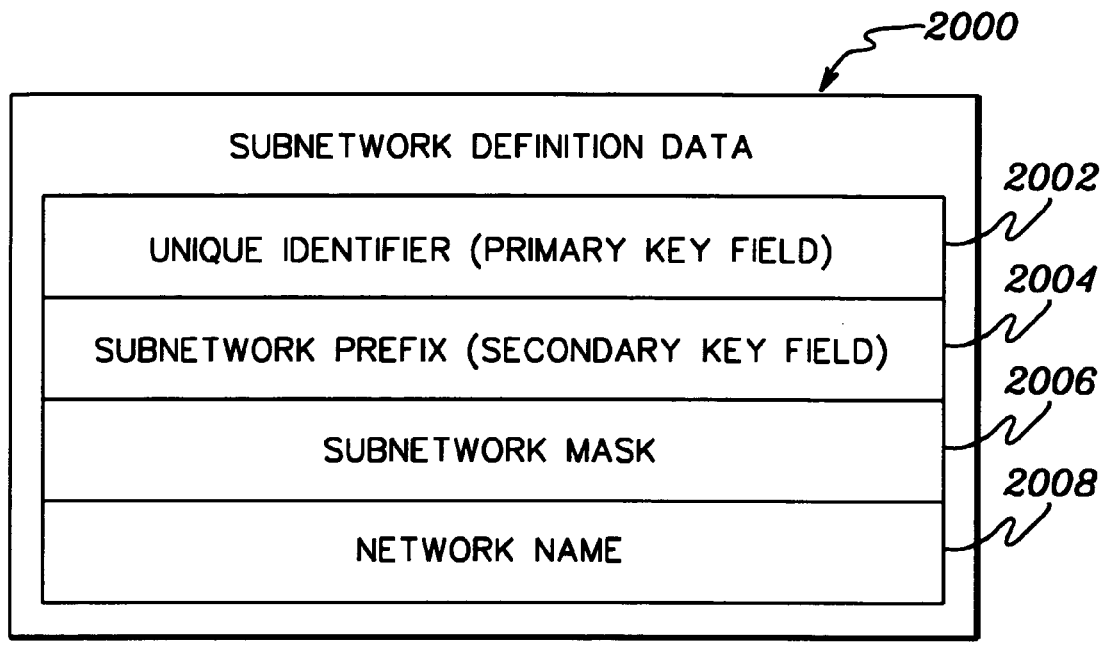
FIG. 20 depicts one example of a subnetwork definition data structure, in accordance with an aspect of the present invention.

In accordance with an aspect of the present invention, each node address definition is mapped to a subnetwork definition. One example of a subnetwork definition data structure is described with reference to FIG. 20.

As one example, a subnetwork definition data structure 2000 includes, for instance, a unique identifier 2002, which provides uniqueness of the subnetwork definition; a subnetwork prefix 2004, which in this particular implementation includes a node address which identifies the prefix of the subnetwork; a subnetwork mask 2006, which is a bit mask denoting how many bits in the subnetwork prefix are relevant; and a network name 2008, which maps the subnetwork definition to an existing network definition.

In the example described herein, the subnetwork object is derived from the way in which the IP protocol mandates their computers be interconnected. For instance, in an IP network, nodes are configured with an IP address and a subnetwork mask. All nodes connected to the same subnetwork should have an address with the same prefix, the length of the prefix being determined by the subnetwork mask. The implementation shown here uses this aspect of IP networks to group the node addresses in groups; in this case, each group includes all of the nodes which are in the same subnetwork. The subnetworks have been mapped into network definitions, and the routing of the cluster traffic is then controlled by modifying the parameters of the network objects, as described below.

Figure 21:
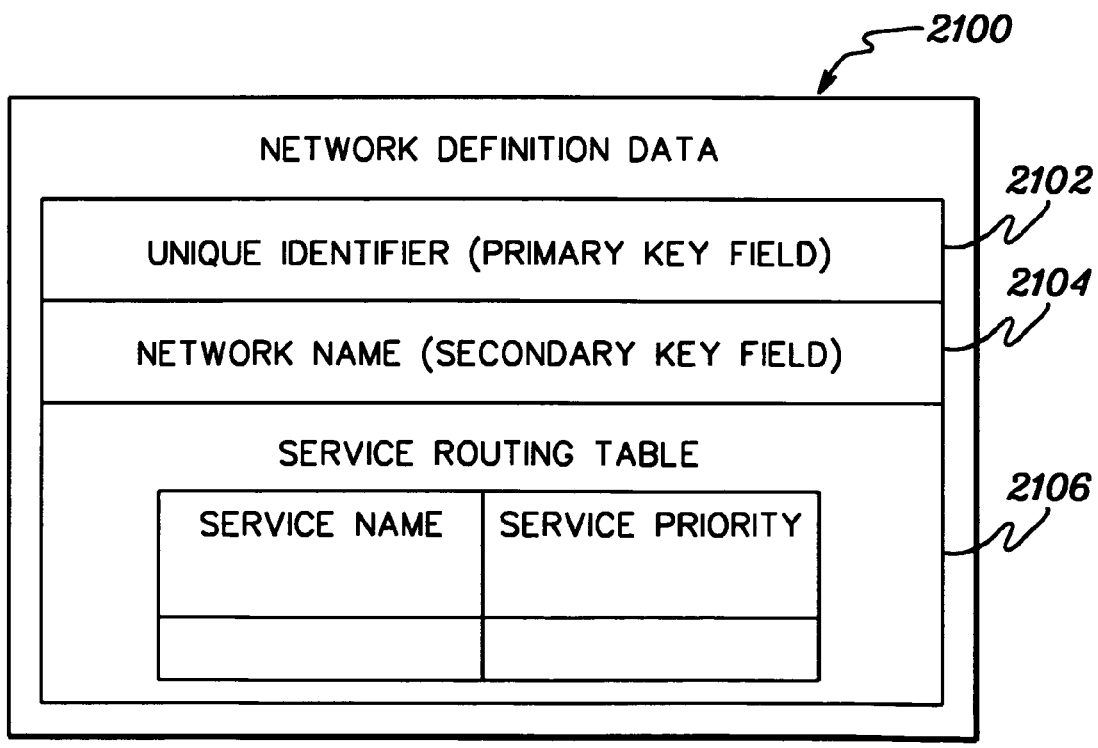
FIG. 21 depicts one aspect of a network definition data structure, in accordance with an aspect of the present invention.

One example of a network definition data structure is depicted in FIG. 21. Network definition data structure 2100 includes, for instance, a unique identifier 2102, which provides uniqueness of the network definition; a network name 2104, which is used to map subnetwork objects to network objects; and a service routing table 2106, which is a table of values used in making the decision of which network to use in transmitting requests for the various cluster services. The service routing table includes, for instance, the names of the cluster components which generate system traffic, and the priority for the utilization of that network for such service.

For example, a cluster may be defined with three network objects, named A, B and C. Suppose that a cluster component wants to read the global configuration from the System Registry. It first retrieves the list of registry servers for the specific cluster. In this example, the list contains three addresses, which are labeled, 1, 2 and 3. It then chooses which one to use, according to the priorities which are set by the system administrator. This component then follows a mapping described below, which maps a service node address (which is listed in the list of registry servers) to a network object.

In this example, Address 1 maps to Network A, Address 2 to Network B and Address 3 maps to Network C. Now, the component reads the priority value stored in the service routing table of each network object, which refers to the service that it wants to use (e.g., the System Registry). These values are set by the system administrator, according to his or her preferences for that system. In this example, assume that the value for the System Registry priority is 3 in Network A, 2 in Network B and 1 in Network C. The highest priority number is found in Network A, and therefore, the component tries to reach the System Registry component using first the address that maps to Network A (labeled 1, above). Then, if that fails, the component tries to use the address that maps to Network B, and finally the address that maps to Network C.

Further details relating to the manner in which a client of cluster services chooses a specific address for a service are described with reference to the example depicted in FIG. 22.

Figure 22:
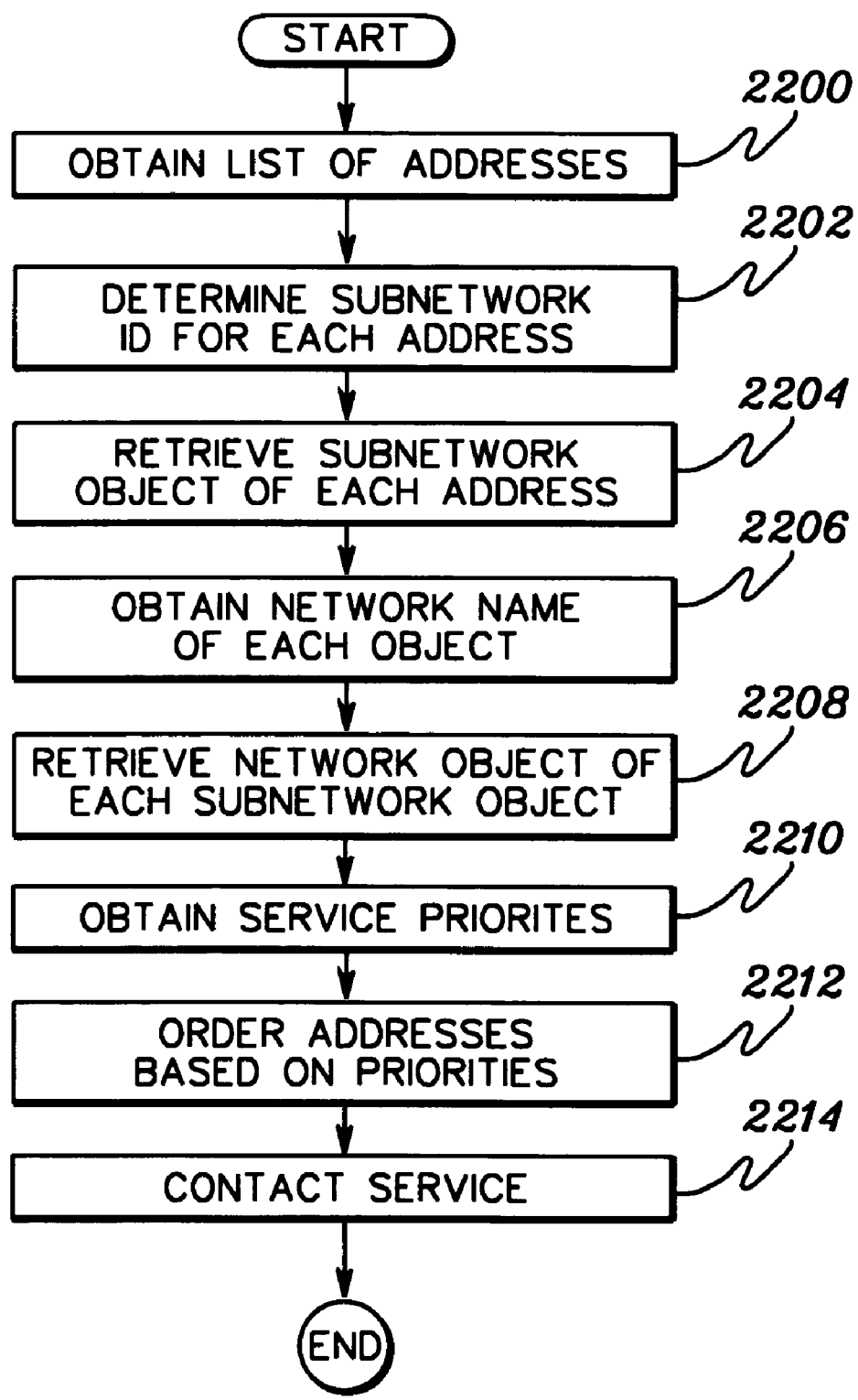
FIG. 22 depicts one embodiment of the logic used by a client of a clustered environment to choose a specific address to locate a service, in accordance with an aspect of the present invention.

In one embodiment, initially, the client retrieves a list of possible addresses where the service is present, STEP 2200 (FIG. 22). The manner in which the list of addresses is retrieved is different for each service. In the case of the System Registry, the list of registry server nodes is retrieved from the local configuration file. Other services may publish the list of node addresses in, for instance, the global cluster configuration.

Figure 23:
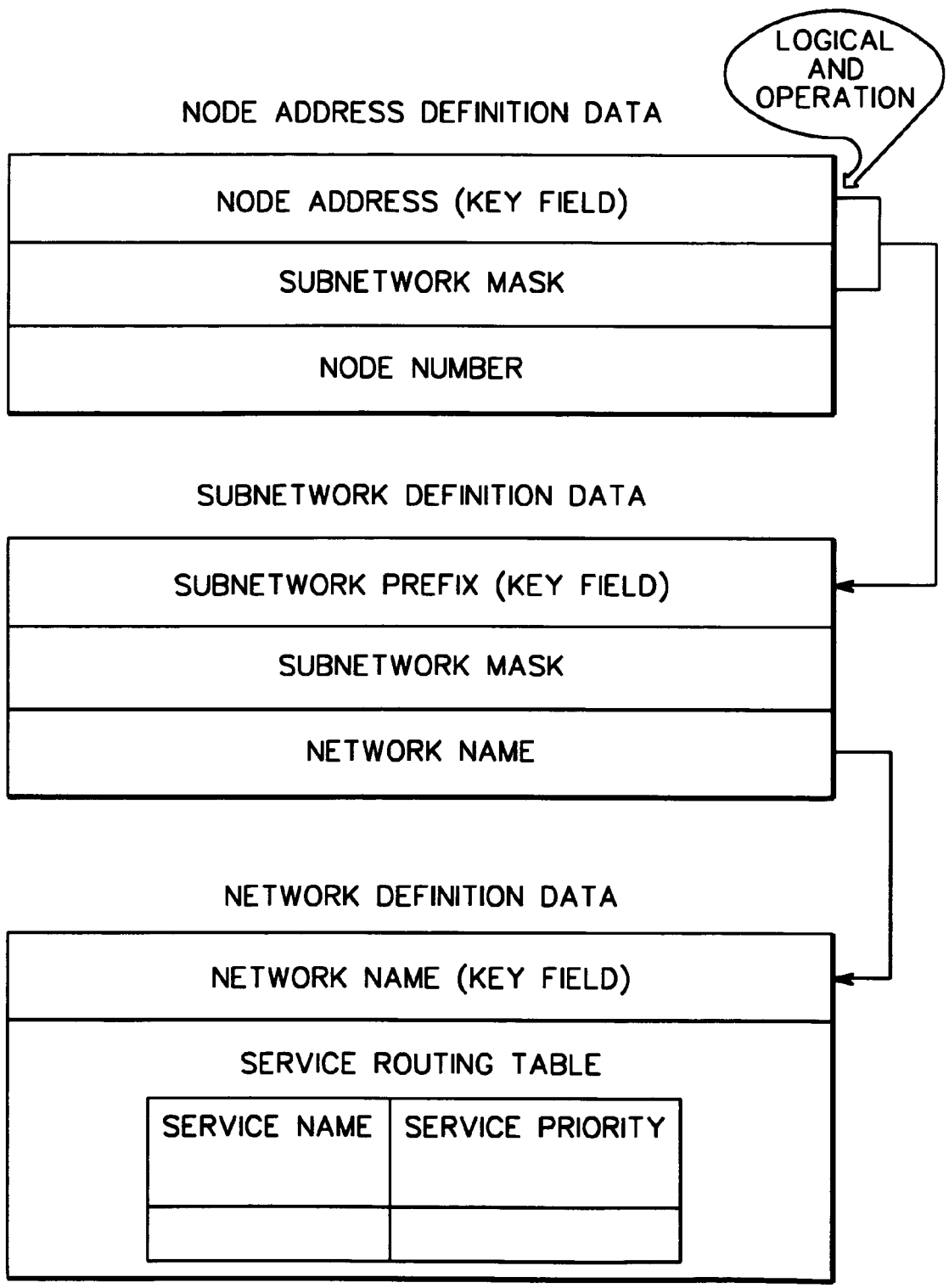
FIG. 23 depicts one example of the mapping of a node address definition into subnetwork and network definitions, in accordance with an aspect of the present invention.

Subsequent to obtaining the list of node addresses, the client looks up each node address in the node address definition data structure, stored in the global cluster configuration. For each address, the client performs a logical AND operation of the node address and subnetwork mask (see FIG. 23) to obtain a resulting subnetwork id for each address, STEP 2202 (FIG. 22).

Thereafter, the client retrieves the subnetwork object for each of the addresses, STEP 2204, and for each subnetwork object, the client retrieves the network name, which is associated with the subnetwork, STEP 2206.

Subsequently, the client retrieves each network to which the service addresses are mapped, STEP 2208. It then reads the service priority numbers from the service routing table, which is stored in each network object, STEP 2210. The client then orders the list of node addresses, according to the priorities, which were set by the system administrator in the network objects, STEP 2212.

Thereafter, the client attempts to contact the service in order of the priorities, STEP 2214.

The above technique provides the administrator of the cluster with a mechanism that contains the traffic associated with specific kinds of services to specific networks. The technique offers network traffic control in such a way that is meaningful for an administrator. It can be noted that the client retrieves a list of node addresses for this service. Initially, this list is not ordered, since the list is published by the service itself. In the example above, it is the System Registry which publishes, by means of the DCM component, the list of its node addresses. However, the System Registry has no knowledge of the network structure or of the system administrator preferences, and therefore, cannot offer an ordered list. Thus, the system administrator can assign subnetwork objects to network objects, as the above mapping indicates.

A change made by the system manager affects the service priority assignments for all addresses which map to the subnetwork which was moved. This operation is localized to a change in the subnetwork table, which is understood by the other components. This facility offers a central point of control with which a system administrator can control the system traffic for all components of the cluster system.

Described above is one technique for ordering a list of service addresses according to priorities set by the system administrator. However, in some cases, the system administrator may employ equivalent networks, for which there is no priority preference. In this case, it is desirable, for instance, to order the list of service addresses in order of proximity to the client, in terms of routing steps, or hops. In the standard IP protocol, a datagram which is sent from a specific subnetwork will only reach nodes in that specific subnetwork, if it is not routed. In order for the datagram to reach other nodes, it is routed (i.e., it goes through a router, or package switching node, which is connected to both the subnetwork where the datagram is originated and to either the target network or to another router or sequence of routers, one of which has access to the target network.) The step of routing a package through a package switching node is termed a hop. There is a cost in performance associated with a hop, since the package switching operation slows the receiving of the packet in the target subnetwork.

Therefore, when the system administrator does not set any priority preferences for the utilization of the cluster networks for a specific service, it is beneficial to order the list according to the minimal number of hops that a datagram will incur in being routed from the server to the client. Furthermore, if more than one server is equidistant to the client (i.e., if more than one server can be reached using exactly the same number of hops), then it becomes beneficial to order the lists differently for each client, such that the service load is spread equally among the equidistant servers.

The following technique offers a facility with which a list of service addresses is ordered according to the criteria of lower distance and load balancing. This technique is employed by the DCM when it stores the list of registry servers in each node (in the case that the system administrator has not set any priorities for the utilization of the cluster networks). As described below, this technique utilizes both the distance of the client to the server, as well as a mapping which distributes the workload equally among the servers. The workload distribution is based on a formula which is derived from the total number of nodes in each subnetwork, from the individual node number of each node, and from the number of equidistant servers.

One embodiment of the logic used to produce an ordered list of addresses to be used by a particular node in the cluster to reach a specific service, is described with reference to FIG. 24. In one example, the input parameters for this technique include a list of addresses for a specific service; the node number of the node, which is to be the client for the specific service; the addresses for any communication interfaces (node addresses) present on that node; and the distance of the node from each of the other servers, in terms of the number of hops. It should be noted that this parameter can be estimated using standard IP trace route facilities.

The output is an ordered list of service addresses, which is tailored for the specific node which is identified by the unique node number. This list is ordered according to minimal cost and uses load balancing for equidistant servers.

Figure 24:
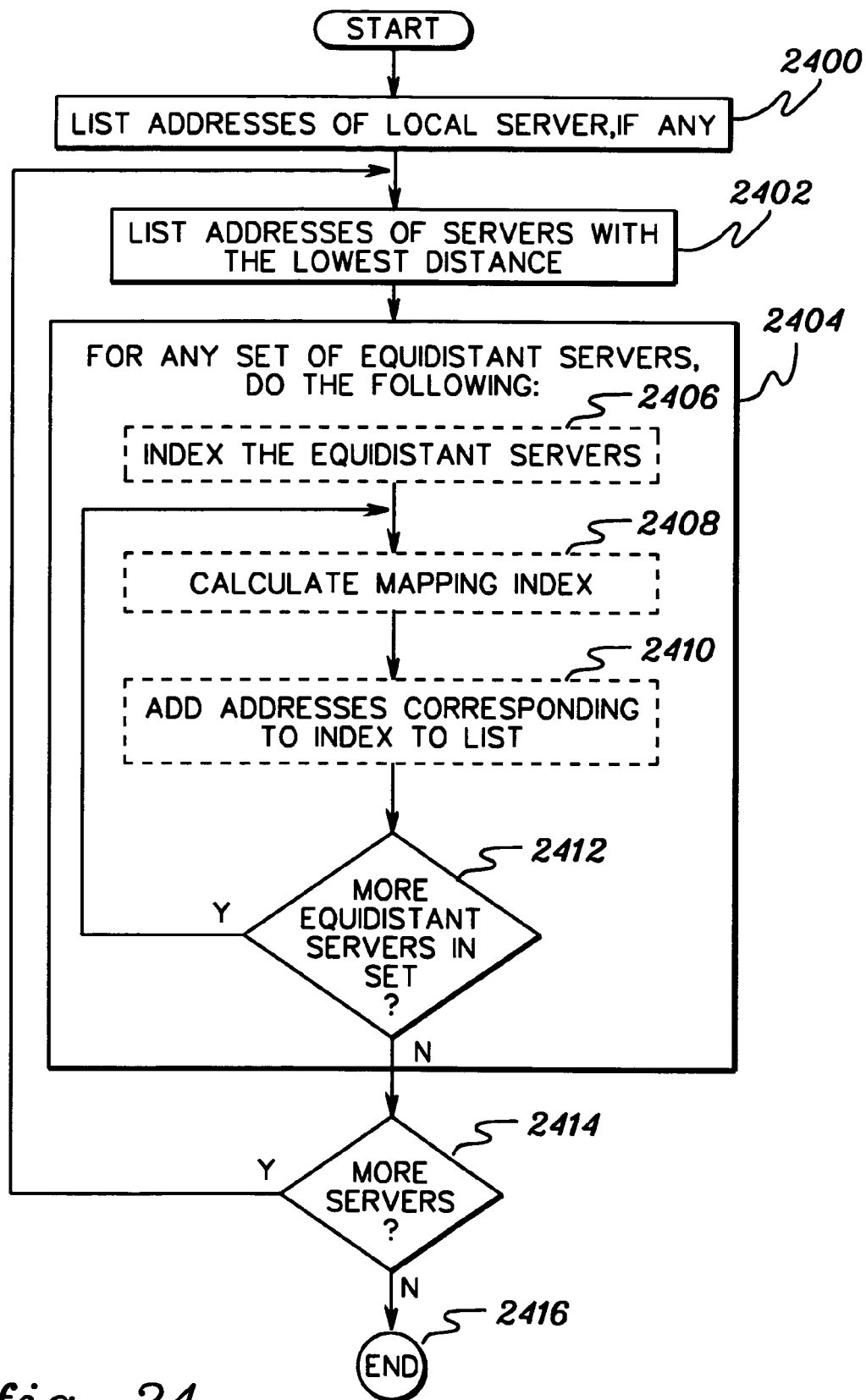
FIG. 24 depicts another embodiment of the logic used to produce an ordered list of addresses to be used by a particular node in a cluster to reach a specific service, in accordance with an aspect of the present invention.

Referring to FIG. 24, initially, if any of the addresses in the input list corresponds to a node interface which is present in the node itself, then these addresses are placed first on the resulting ordered list, STEP 2400. This results in local clients having the preference of using servers that co-exist on the same node, resulting in the best possible performance. Next, the addresses of servers with the lowest distance (in terms of number of hops) are listed, STEP 2402.

In the case that there are equidistant servers (i.e., servers that are reachable using the same number of hops), a further optimization of the ordering is possible. If there are two equidistant servers, it is beneficial to list one of them first in half of the clients and to list the other first in the other half. That makes half of the clients have a preference for one server and the other half to the other server, achieving an ideal load balancing scheme. If there were three servers, the first position can be split in three ways.

One technique for deciding which server is to be listed first is described herein, STEP 2404. In particular, initially, a set of equidistant servers (i.e., a set of servers having the same number of hops) is indexed 0, 1, 2, etc., according to their node addresses, from lowest to highest, STEP 2406. Since node addresses are unique, this mapping is also unique.

Next, the mapping index for one of the equidistant servers is calculated using a predefined equation, STEP 2408. In particular, for k=0 to the number of equidistant servers−1, the mapping index is equal to the [((node_number)mod (number_of_equidistant_servers)+k) mod(number_of_equidistant_servers)], where mod refers to the module operation defined as the integer remainder of a division operation.

After calculating the mapping index, a corresponding address of the mapping index is then added to the list, STEP 2410.

Subsequently, a determination is made as to whether there are more equidistant servers in the set, INQUIRY 2412. If there are more equidistant servers in the set, then processing continues with STEP 2408. Otherwise, processing continues with INQUIRY 2414, in which a determination is made as to whether there are more servers to be processed in the input list. If there are more servers, then the process continues with STEP 2402. If not, then a final ordered list of service addresses is provided, and the procedure is complete, STEP 2416.

One example demonstrating the above procedure is described below. Assume the following input:
Node number=5,
Service list (using symbolic node addresses, with distances in parenthesis) include:
{1(0), 3(1), 7(1), 9(1), 12(2), 2(2)}.
To obtain an ordering, the above rules are followed:
1) The technique looks up in any of the Node Address Definition Tables defined for Node 5 to determine if any of the input addresses are in the node address fields of those tables. It discovers that Address 1, with a distance of 0, is local to this node, and is thus, listed first, according to Rule 1, above.
2) The three equidistant servers are ordered by node addresses, with a mapping of: 0->3; 1->7, 2->9. The nodes are reordered using Rules 3 to 7. The number of equidistant servers in this case is 3 and the node number is 5, resulting in:
   a) To select the first server, apply Rule 5 with k=0, resulting in:
      [(5mod3+0)mod3]=2; the result is the mapping index to the list obtained in the step above. In this case the mapping index 2 maps to server address 9.
   b) For the second server, Rule 5 is reiterated, with k now being 1, resulting in:
      [(5mod3+1)mod3], which is [(2+1)mod3]=0, which maps to server 3.
   c) Similarly, the next iteration of Rule 5 is now made with k=2, resulting in:
      [(5mod3+2)mod3], which is [(2+2)mod3]=1, which maps to server 7.
3) The same procedure (Rules 2 to 5) are now used for the second set of equidistant servers. First the mapping indexes are assigned: 0->12, 1->2. The number of equidistant servers is now 2:
   a) The first iteration of Rule 5 yields:
      [(5mod2+0)mod2]=1, which maps to server 2.
   b) The second iteration, with k=1, yields:
      [(5mod2+1)mod2]=0, which maps to server 12.
4) The final product is a list as follows:
   {1, 9, 3, 7, 2, 12}.

It can be observed that the output list would be different for each client node number, resulting in a balanced list for each client.

In addition to the above, DCM maintains the ordered lists. In one example, it refreshes the local list, whenever it receives notification that a new service node has been added or deleted.

Described above are various aspects of managing a clustered environment. A clustered architecture, as well as techniques for managing clusters, are provided. Various techniques of the invention are applicable to single systems, homogeneous systems, as well as heterogenous systems. As one example, capabilities are provided to facilitate the interoperability of the systems of a heterogeneous environment.

In the embodiments described herein, the global data is stored remotely from the nodes in one or more repositories (global storage). However, in other examples, each repository can be local to one or more nodes. Further, each repository can be remote or local to users of the repository.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of managing clusters of a computing environment, said system comprising:
   a registry component to provide global data storage for global data of a cluster of said computing environment, said cluster including a plurality of nodes of said computing environment and said global data comprising configuration data of multiple nodes of the plurality of nodes;
   a configuration component to maintain data locally on at least one node of said plurality of nodes, and to store global data in said registry component;

a liveness component to provide status of one or more communications paths of said cluster, said liveness component being dependent upon said registry component and said configuration component;

a group services component to provide one or more services to one or more other components of said cluster, said group services component being dependent on said registry component, said configuration component and said liveness component;

a resource management component to provide communications to one or more resource controllers of said cluster, said resource management component being dependent on said registry component, said configuration component and said group services component;

wherein said configuration component is responsible for starting one or more components of said registry component, said liveness component, said group services component and said resource management component, and wherein said one or more components are started by the configuration component in a defined order comprising starting the registry component, and then the liveness component, the group services component and the resource management component.

2. The system of claim 1, wherein said registry component is dependent on said group services component for at least one type of operation.

3. The system of claim 2, wherein said at least one type of operation comprises a write operation.

4. The system of claim 2, wherein said registry component is functionally dependent on said group services component.

5. The system of claim 1, wherein said being dependent comprises being functionally dependent.

6. The system of claim 5, wherein said registry component lacks a data dependency on said configuration component, said liveness component, said group services component and said resource management component.

7. The system of claim 5, wherein said configuration component has a data dependency on said registry component.

8. The system of claim 5, wherein said liveness component has a data dependency on said registry component.

9. The system of claim 5, wherein said group services component has a data dependency on said registry component.

10. The system of claim 5, wherein said resource management component has a data dependency on said registry component.

11. The system of claim 5, wherein said liveness component has a data dependency on said configuration component.

12. The system of claim 5, wherein said group services component has a data dependency on said configuration component.

13. The system of claim 5, wherein said resource management component has a data dependency on said configuration component.

14. The system of claim 1, wherein said cluster includes a plurality of nodes, and wherein said registry component is included on less than all nodes of said plurality of nodes.

15. The system of claim 1, wherein said configuration component is started by at least one operating system of at least one node of said one or more nodes of said computing environment.

16. The system of claim 1, wherein the starting of one or more components satisfies at least one of one or more functional dependencies between the one or more components and one or more data dependencies between the one or more components.

17. The system of claim 1, wherein said registry component begins a first phase of its initialization, in response to being started, said first phase of initialization comprising determining at least one copy of a global configuration database to be used in the starting.

18. The system of claim 17, wherein said configuration component utilizes a copy of said at least one copy of the global configuration database to verify data, and then continue with starting the liveness component, the group services component and the resource management component.

19. The system of claim 18, wherein said group services component completes its initialization, in response to the liveness component becoming available.

20. The system of claim 19, wherein said registry component begins a second phase of its initialization, in response to the group services component completing initialization, said second phase of initialization comprising updating zero or more copies of the global configuration database to allow write operations against the global configuration database.

21. The system of claim 20, wherein said resource management component performs its initialization using said system registry component and said group services component.

22. A method of managing clusters of a computing environment, said method comprising:

providing, via a registry component, global data storage for global data of a cluster of said computing environment, said cluster including a plurality of nodes of said computing environment and said global data comprising configuration data of multiple nodes of the plurality of nodes;

maintaining, via a configuration component, data locally on at least one node of said plurality of nodes, and to store global data in said registry component;

providing, via a liveness component, status of one or more communications paths of said cluster, said liveness component being dependent upon said registry component and said configuration component;

providing, via a group services component, one or more services to one or more other components of said cluster, said group services component being dependent on said registry component, said configuration component and said liveness component;

providing, via a resource management component, communications to one or more resource controllers of said cluster, said resource management component being dependent on said registry component, said configuration component and said group services component; and starting, via said configuration component, one or more components of said registry component, said liveness component, said group services component and said resource management component, wherein said one or more components are started by the configuration component in a defined order comprising starting the registry component, and then the liveness component, the group services component and the resource management component.

23. The method of claim 22, wherein said registry component is dependent on said group services component for at least one type of operation.

24. The method of claim 23, wherein said at least one type of operation comprises a write operation.

25. The method of claim 23, wherein said registry component is functionally dependent on said group services component.

26. The method of claim 22, wherein said being dependent comprises being functionally dependent.

27. The method of claim 26, wherein said registry component lacks a data dependency on said configuration component, said liveness component, said group services component and said resource management component.

28. The method of claim 26, wherein said configuration component has a data dependency on said registry component.

29. The method of claim 26, wherein said liveness component has a data dependency on said registry component.

30. The method of claim 26, wherein said group services component has a data dependency on said registry component.

31. The method of claim 26, wherein said resource management component has a data dependency on said registry component.

32. The method of claim 26, wherein said liveness component has a data dependency on said configuration component.

33. The method of claim 26, wherein said group services component has a data dependency on said configuration component.

34. The method of claim 26, wherein said resource management component has a data dependency on said configuration component.

35. The method of claim 22, wherein said cluster includes a plurality of nodes, and wherein said registry component is included on less than all nodes of said plurality of nodes.

36. The method of claim 22, wherein said configuration component is started by at least one operating system of at least one node of said one or more nodes of said computing environment.

37. The method of claims 22, wherein the starting of one or more components satisfies at least one of one or more functional dependencies between the one or more components and one or more data dependencies between the one or more components.

38. The method of claim 22, further comprising beginning, by said registry component, a first phase of its initialization, in response to being started, said first phase of initialization comprising determining at least one copy of a global configuration database to be used in the starting.

39. The method of claim 38, further comprising utilizing, by said configuration component, a copy of said at least one copy of the global configuration database to verify data, and then continue with starting the liveness component, the group services component and the resource management component.

40. The method of claim 39, further comprising completing, by said group services component, its initialization, in response to the liveness component becoming available.

41. The method of claim 40, further comprising beginning, by said registry component, a second phase of its initialization, in response to the group services component completing initialization, said second phase of initialization comprising updating zero or more copies of the global configuration database to allow write operations against the global configuration database.

42. The method of claim 41, further comprising performing, by said resource management component, its initialization using said system registry component and said group services component.

43. At least one program storage device readable by a machine tangibly embodying at least one program of instructions executable by the machine to perform a method of managing clusters of a computing environment, said method comprising:
providing, via a registry component, global data storage for global data of a cluster of said computing environment, said cluster including a plurality of nodes of said computing environment and said global data comprising configuration data of multiple nodes of the plurality of nodes;
maintaining, via a configuration component, data locally on at least one node of said plurality of nodes, and to store global data in said registry component;
providing, via a liveness component, status of one or more communications paths of said cluster, said liveness component being dependent upon said registry component and said configuration component;
providing, via a group services component, one or more services to one or more other components of said cluster, said group services component being dependent on said registry component, said configuration component and said liveness component;
providing, via a resource management component, communications to one or more resource controllers of said cluster, said resource management component being dependent on said registry component, said configuration component and said group services component; and
starting, via said configuration component, one or more components of said registry component, said liveness component, said group services component and said resource management component, wherein said one or more components are started by the configuration component in a defined order comprising starting the registry component, and then the liveness component, the group services component and the resource management component.

44. The at least one program storage device of claim 43, wherein said registry component is dependent on said group services component for at least one type of operation.

45. The at least one program storage device of claim 44, wherein said at least one type of operation comprises a write operation.

46. The at least one program storage device of claim 44, wherein said registry component is functionally dependent on said group services component.

47. The at least one program storage device of claim 43, wherein said being dependent comprises being functionally dependent.

48. The at least one program storage device of claim 47, wherein said registry component lacks a data dependency on said configuration component, said liveness component, said group services component and said resource management component.

49. The at least one program storage device of claim 47, wherein said configuration component has a data dependency on said registry component.

50. The at least one program storage device of claim 47, wherein said liveness component has a data dependency on said registry component.

51. The at least one program storage device of claim 47, wherein said group services component has a data dependency on said registry component.

52. The at least one program storage device of claim 47, wherein said resource management component has a data dependency on said registry component.

53. The at least one program storage device of claim 47, wherein said liveness component has a data dependency on said configuration component.

54. The at least one program storage device of claim 47, wherein said group services component has a data dependency on said configuration component.

55. The at least one program storage device of claim 47, wherein said resource management component has a data dependency on said configuration component.

56. The at least one program storage device of claim 43, wherein said cluster includes a plurality of nodes, and wherein said registry component is included on less than all nodes of said plurality of nodes.

57. The at least one program storage device of claim 43, wherein said configuration component is started by at least one operating system of at least one node of said one or more nodes of said computing environment.

58. The at least one program storage device of claim 43, wherein the starting of one or more components satisfies at least one of one or more functional dependencies between the one or more components and one or more data dependencies between the one or more components.

59. The at least one program storage device of claim 43, wherein said method further comprises beginning, by said registry component, a first phase of its initialization, in response to being started, said first phase of initialization comprising determining at least one copy of a global configuration database to be used in the starting.

60. The at least one program storage device of claim 59, wherein said method further comprises utilizing, by said configuration component, a copy of said at least one copy of the global configuration database to verify data, and then continue with starting the liveness component, the group services component and the resource management component.

61. The at least one program storage device of claim 60, wherein said method further comprises completing, by said group services component, its initialization, in response to the liveness component becoming available.

62. The at least one program storage device of claim 61, wherein said method further comprises beginning, by said registry component, a second phase of its initialization, in response to the group services component completing initialization, said second phase of initialization comprising updating zero or more copies of the global configuration database to allow write operations against the global configuration database.

63. The at least one program storage device of claim 62, wherein said method further comprises performing, by said resource management component, its initialization using said system registry component and said group services component.

64. The system of claim 1, wherein the configuration data comprises multiple node definitions for the multiple nodes.

65. The system of claim 1, wherein said computing environment is a shared nothing environment.

* * * * *